(12) United States Patent
Cheng

(10) Patent No.: US 12,313,417 B2
(45) Date of Patent: May 27, 2025

(54) TRAVEL ROUTE PLANNING METHOD AND TRAVEL ROUTE RECOMMENDATION METHOD

(71) Applicant: TENCENT TECHNOLOGY (SHENZHEN) COMPANY LIMITED, Shenzhen (CN)

(72) Inventor: Shengyuan Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 171 days.

(21) Appl. No.: 17/986,453

(22) Filed: Nov. 14, 2022

(65) Prior Publication Data

US 2023/0075758 A1 Mar. 9, 2023

Related U.S. Application Data

(63) Continuation of application No. PCT/CN2022/080052, filed on Mar. 10, 2022.

(30) Foreign Application Priority Data

Mar. 23, 2021 (CN) .......................... 202110308166.X

(51) Int. Cl.
G01C 21/34 (2006.01)
(52) U.S. Cl.
CPC ................................ G01C 21/3484 (2013.01)
(58) Field of Classification Search
None
See application file for complete search history.

(56) References Cited

U.S. PATENT DOCUMENTS

| 6,421,606 B1 * | 7/2002 | Asai | G08G 1/123 |
| | | | 701/410 |
| 9,441,980 B2 * | 9/2016 | Corne | G01C 21/3446 |

(Continued)

FOREIGN PATENT DOCUMENTS

| CN | 101363737 A | 2/2009 |
| CN | 101915582 A | 12/2010 |

(Continued)

OTHER PUBLICATIONS

Yadav, R. K., "Comparative Analysis of Route Planning Algorithms on Road Networks", Jul. 10, 2020, IEEE (Year: 2020).*

(Continued)

*Primary Examiner* — Todd Melton
*Assistant Examiner* — Sarah A. Mueller
(74) *Attorney, Agent, or Firm* — ANOVA LAW GROUP, PLLC

(57) ABSTRACT

This application relates to the fields of map navigation and smart travel, and provides a travel route planning method and apparatus, a computer device, and a storage medium, and provides a travel route recommendation method and apparatus, a computer device, and a storage medium. The travel route planning method includes obtaining a start place, a destination, and travel preference conditions; determining a plurality of route planning methods corresponding to the travel preference conditions, each route planning method having route planning constraint conditions corresponding to the travel preference conditions; performing route planning using each route planning method based on the route planning constraint conditions corresponding to the corresponding route planning method, the start place, and the destination, to obtain a candidate route set planned; and performing route deduplication on the candidate route set to obtain a travel route set.

20 Claims, 12 Drawing Sheets

(56) References Cited

U.S. PATENT DOCUMENTS

| | | | |
|---|---|---|---|
| 11,959,760 B2* | 4/2024 | Cserna | G01C 21/3484 |
| 12,062,009 B2* | 8/2024 | Huang | G01C 21/3484 |
| 2002/0128767 A1 | 9/2002 | Cardno et al. | |
| 2003/0093217 A1 | 5/2003 | Petzold et al. | |
| 2007/0021905 A1* | 1/2007 | Takashima | G01C 21/3461 |
| | | | 701/533 |
| 2009/0048775 A1 | 2/2009 | Okude et al. | |
| 2011/0112759 A1* | 5/2011 | Bast | G01C 21/3423 |
| | | | 701/533 |
| 2020/0072623 A1 | 3/2020 | Sunil Kumar et al. | |

FOREIGN PATENT DOCUMENTS

| | | |
|---|---|---|
| CN | 103512581 A | 1/2014 |
| CN | 104075720 A | 10/2014 |
| CN | 109506669 A | 3/2019 |
| CN | 109598368 A | 4/2019 |
| CN | 111815047 A | 10/2020 |
| CN | 112308315 A | 2/2021 |

OTHER PUBLICATIONS

The World Intellectual Property Organization (WIPO) International Search Report for PCT/CN2022/080052 May 31, 2022 8 Pages (including translation).
China National Intellectual Property Administration (CNIPA) Office Action 1 for Application No. 202110308166.X Feb. 25, 2025 9 Pages (including translation).
Chen Huiyan, ed. Introduction to Autonomous Vehicles, Beijing Institute of Technology Press, Jul. 31, 2024 (Jul. 31, 2014), pp. 36-140.

* cited by examiner

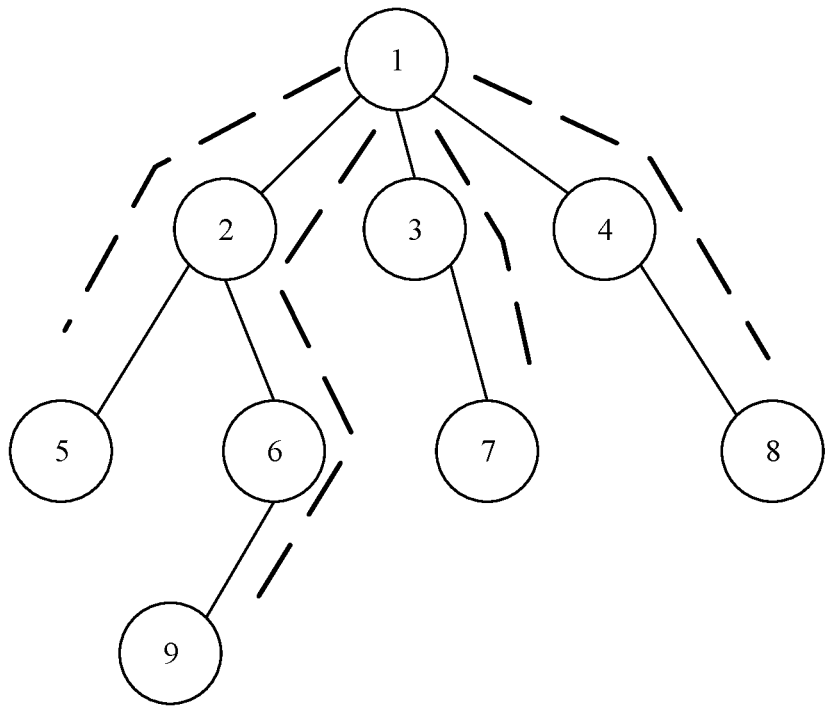

FIG. 11

| Step 1202: Display an inputted start place and destination, and a plurality of candidate travel preference tags on a travel route query page of an electronic map |—1202

↓

Step 1204: Display, in response to a selection operation of a target travel preference tag in the candidate travel preference tags, a travel route recommendation region corresponding to a travel preference condition represented by the target travel preference tag |—1204

↓

Step 1206: Display a plurality of travel routes in the travel route recommendation region in a sorted manner, the plurality of travel routes being obtained by respectively planning in a plurality of route planning manners corresponding to the travel preference conditions, and each travel route connecting the start place and the destination and meeting the route planning constraint conditions that match the used route planning manner |—1206

FIG. 12

TRAVEL ROUTE PLANNING METHOD AND TRAVEL ROUTE RECOMMENDATION METHOD

RELATED APPLICATIONS

This application is a continuation of PCT Application No. PCT/CN2022/080052, filed on Mar. 10, 2022, which in turn claims priority to Chinese Patent Application No. 202110308166X, filed with the Chinese Patent Office on Mar. 23, 2021, and entitled "TRAVEL ROUTE PLANNING METHOD AND TRAVEL ROUTE RECOMMENDATION METHOD." The two applications are incorporated herein by reference in their entirety.

FIELD OF THE TECHNOLOGY

This application relates to the field of computer technologies, and in particular, to a method and an apparatus for planning a travel route, a computer device, a computer-readable storage medium and a computer program product, and to a method and an apparatus for recommending a travel route, a computer device, a computer-readable storage medium and a computer program product.

BACKGROUND OF THE DISCLOSURE

With the development of Internet technology, various travel applications provide route planning services for users, and can quickly and conveniently provide users with travel reference information according to a start place and a destination inputted by the user.

An existing route planning method performs route planning by traversing all graph nodes, and finds a global optimal route through global traversal. However, since all graph nodes need to be traversed in a search process, the process of planning and obtaining a travel route is not efficient.

SUMMARY

Various embodiments of this application provide a method and an apparatus for planning a travel route, a computer device, a computer-readable storage medium and a computer program product, and provide a method and an apparatus for recommending a travel route, a computer device, a computer-readable storage medium and a computer program product.

One aspect of the present disclosure provides a travel route planning method, performed by a computer device. The travel route planning method includes obtaining a start place, a destination, and travel preference conditions; determining a plurality of route planning methods corresponding to the travel preference conditions, each route planning method having route planning constraint conditions corresponding to the travel preference conditions; performing route planning using each route planning method based on the route planning constraint conditions corresponding to the corresponding route planning method, the start place, and the destination, to obtain a candidate route set planned; and performing route deduplication on the candidate route set to obtain a travel route set.

Another aspect of the present disclosure provides a computer device, including a memory and one or more processors, the memory storing computer-readable instructions, the computer-readable instructions, when executed by the one or more processors, causing the one or more processors to perform steps of at least one of the travel route recommendation method and the travel route planning method.

Another aspect of the present disclosure provides one or more non-transitory computer-readable storage media, storing computer-readable instructions, the computer-readable instructions, when executed by one or more processors, causing the one or more processors to perform steps of at least one of the travel route recommendation method and the travel route planning method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

FIG. 11 is a schematic diagram of a search process based on breadth first search (BFS) in an embodiment.

FIG. 12 is a schematic flowchart of a travel route recommendation method in an embodiment.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
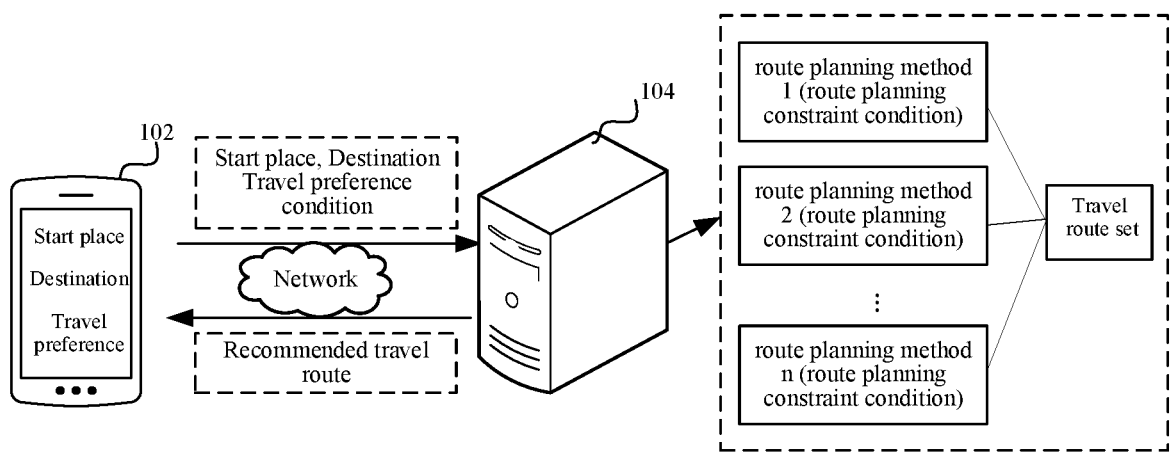
FIG. 1 is a diagram of an application environment of a travel route planning method in an embodiment.

The schemes according to embodiments of this application may involve technologies such as artificial intelligence (abbreviated as AI), machine learning (abbreviated as ML), and the like. A travel route planning method according to this application may be applied in an application environment as shown in FIG. 1. A terminal 102 communicates with a server 104 through a network. The terminal 102 is connected to the server 104 through a network. The method according to each embodiment of this application may be performed jointly by the terminal 102 and the server 104, and may further be performed separately by the terminal 102 or the server 104. Using the joint execution by the terminal 102 and the server 104 as an example, the server 104 receives a start place, a destination, and travel preference conditions uploaded by the terminal 102, and determines a plurality of route planning methods corresponding to the travel preference conditions, each route planning method having corresponding route planning constraint conditions matching the travel preference conditions. The server 104 performs, for each route planning method, route planning respectively based on the route planning constraint conditions corresponding to the corresponding route planning method, the start place, and the destination, to obtain a candidate route set planned in the plurality of route planning methods. The server 104 performs route deduplication on the candidate route set to obtain a travel route set. The server 104 pushes recommended travel routes screened out from the travel route set to the terminal 102.

Figure 2:
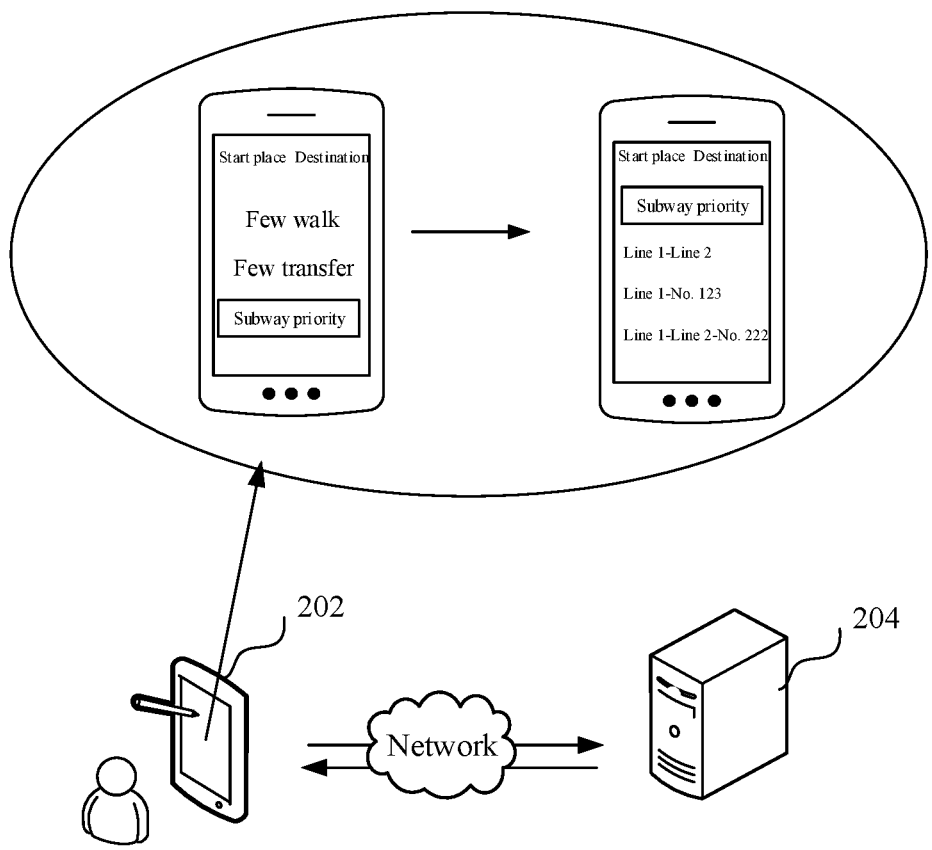
FIG. 2 is a diagram of an application environment of a travel route recommendation method in an embodiment.

This application further provides a travel route recommendation method, which may be applied in an application environment as shown in FIG. 2. A terminal 202 displays an inputted start place and destination, and a plurality of candidate travel preference tags on a travel route query page of an electronic map; displays, in response to a selection operation of a target travel preference tag in the candidate travel preference tags, a travel route recommendation region corresponding to a travel preference condition represented by the target travel preference tag; and displays a plurality of travel routes in the travel route recommendation region in a sorted manner, the plurality of travel routes being obtained by respectively planning in a plurality of route planning methods corresponding to the travel preference conditions, and each travel route connecting the start place and the destination and meeting route planning constraint conditions that match the used route planning method. As a result, a fast and accurate travel route recommendation is implemented. A planning process of the plurality of travel routes may be implemented based on the terminal 202, or may be implemented based on a server 204.

The terminal 102 and the terminal 202 may be, but are not limited to, various desktop computers, laptops, smartphones, tablets, in-vehicle devices, and portable wearable devices. The server 104 and the server 204 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner, which is not limited in this application.

Figure 3:
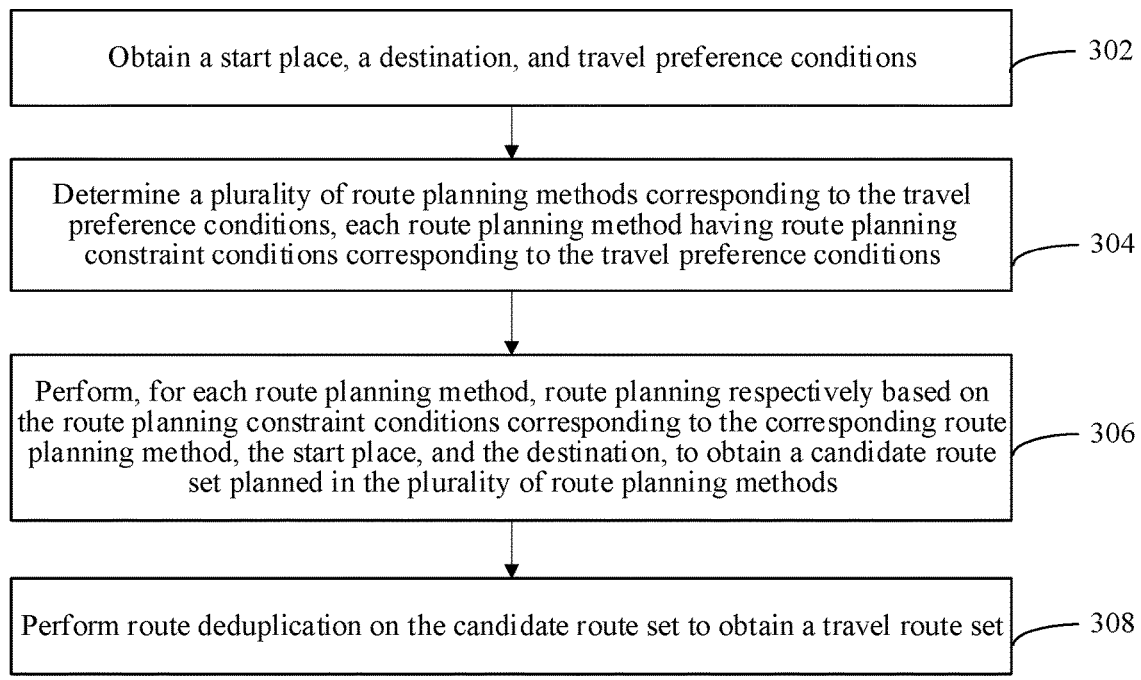
FIG. 3 is a schematic flowchart of a travel route planning method in an embodiment.

In an embodiment, as shown in FIG. 3, a travel route planning method is provided. A description is made using an example in which the method is applied to a computer device in FIG. 1. The computer device may be the terminal or the server in FIG. 1. The travel route planning method includes the following steps 302 to 308.

Step 302: Obtain a start place, a destination, and travel preference conditions.

The start place refers to a departure location determined by a user through an electronic map application of the terminal. The start place may be a current positioned location obtained by the electronic map application through positioning, or may be a departure location inputted or selected by the user through terminal operations. For example, a location corresponding to a name of a start place that the user inputs in an input field of start place information of the electronic map application, or a location determined by map point selection on a start place determination interface of the electronic map application, or a location selected from preset frequently used locations (such as a company or home) displayed on the start place determination interface of the electronic map application.

The destination refers to a desired location inputted by the user in a display interface of the electronic map application of the terminal. The destination may be a to-be-reached location that the user inputs or selects through terminal operations. For example, the destination may be: a location corresponding to a name (such as a cell or a train station) of a destination that the user inputs in an input field of destination information of the electronic map application, or a location determined by map point selection on a destination determination interface of the electronic map application, or a location selected from preset frequently used locations (such as a company or home) displayed on the destination determination interface of the electronic map application.

The travel preference conditions are conditions that characterize travel needs of the user, and may specifically include at least one of conditions such as subway priority, few walks, short time, few transfers, and no subway rides. Specifically, in the electronic map application, candidate travel preference conditions may be provided, the user may select a travel preference condition, and the terminal may determine the travel preference condition selected by the user based on a selection operation of the user.

Further, the terminal sends the start place, the destination, and the travel preference conditions to the server based on the start place, the destination, and the travel preference conditions inputted by the user in the electronic map application, and the server performs route planning based on the start place, the destination, and the travel preference conditions.

Specifically, the terminal generates a route planning request carrying a start place, a destination, and travel preference conditions based on the start place, the destination, and the travel preference conditions inputted by the user in the electronic map application, and the server performs route planning based on the start place, the destination, and the travel preference conditions in the received route planning request.

Step 304: Determine a plurality of route planning methods corresponding to the travel preference conditions, each route planning method having route planning constraint conditions corresponding to the travel preference conditions. In some embodiments, route planning constraint conditions corresponding to the travel preference conditions may include route planning constraint conditions matching the travel preference conditions.

The route planning method refers to a data processing algorithm that plans a travel route from a start place to a destination based on the start place and the destination of the travel. There are many route planning methods, such as simulated annealing algorithm, artificial potential field, fuzzy logic algorithm, taboo search algorithm and other traditional algorithms, such as C space method, grid method, free space method and other graphics methods, as well as one algorithm or a combination of multiple algorithms of intelligent bionics algorithms such as ant colony algorithm, neural network algorithm, particle colony algorithm, and genetic algorithm. The combination of multiple algorithms refers to a combination of two or more algorithms. For different application scenarios, various route planning algorithms have different advantages. For example, for an application scenario of travel route planning, a better route planning result can be obtained by the optimal search algorithm of a graph, such as blind search or heuristic search.

The route planning constraint conditions refer to conditions that the route planning method needs to meet in a route planning process. The route planning constraint conditions match the travel preference conditions. Further, each route planning method corresponding to the travel preference conditions is a route planning method having corresponding route planning constraint conditions matching the travel preference conditions, so as to ensure that results obtained based on planning by the route planning method satisfy the travel preference conditions.

For example, a route planning method 1 has a corresponding route planning constraint condition A1, and the route planning constraint condition A1 matches a travel preference condition a, then the route planning method 1 is one of route planning methods corresponding to the travel preference condition a. The travel preference condition a may correspond to route planning constraint conditions corresponding to a plurality of different route planning methods, for example, a route planning constraint condition A2 corresponding to a route planning method 2, a route planning constraint condition A3 corresponding to a route planning method 3, and so on, thereby obtaining a plurality of route planning methods corresponding to the travel preference conditions.

Step 306: Perform, for each route planning method, route planning respectively based on the route planning constraint conditions corresponding to the corresponding route planning method, the start place, and the destination, to obtain a candidate route set planned in the plurality of route planning methods.

The route planning refers to a process of determining travel routes from a start place to a destination. Since different route planning methods have different data processing processes, the plurality of route planning methods may be implemented with one-to-one corresponding multiple route planning threads. In an embodiment, each route planning method is implemented by a route planning engine.

The route planning engine is a core component that runs an algorithm corresponding to the route planning method. Different route planning engines run the algorithm corresponding to the route planning method, so that the efficiency of route planning based on the plurality of route planning methods may be improved.

For each route planning method, the route planning is performed based on the route planning constraint conditions corresponding to the route planning method, the start place, and the destination, to obtain candidate routes planned by each route planning method. The candidate route set includes the candidate routes planned by each route planning method. For example, the route planning method 1 plans three candidate routes a, b, and c, the route planning method 2 plans two candidate routes m1 and n1, and the route planning method 3 plans four candidate routes m2, n2, x, and y, and then the candidate route set includes nine routes a, b, c, m1, n1, m2, n2, x, and y.

Step 308: Perform route deduplication on the candidate route set to obtain a travel route set.

The route deduplication refers to a processing process of performing deduplication processing on a plurality of repetitive routes, and retaining only one of the plurality of repetitive routes. For example, the candidate route set includes nine routes a, b, c, m1, n1, m2, n2, x, y, where m1 and m2 are the same route, n1 and n2 are the same route, then for the routes m1 and m2, only one of m1 and m2 is retained, and for the routes n1 and n2, only one of n1 and n2 is retained, so as to implement deduplication of the routes in the candidate route set.

The travel route planning method obtains the start place, the destination, and the travel preference conditions, and uses the travel preference condition as a route planning constraint condition, to determine a plurality of route planning methods corresponding to the travel preference conditions. Each route planning method has corresponding route planning constraint conditions matching the travel preference conditions, which facilitates the implementation of route planning based on the plurality of route planning methods. For each route planning method, route planning is performed based on the route planning constraint conditions corresponding to the corresponding route planning method, the start place, and the destination. On the one hand, based on the route planning constraint conditions, a data processing amount of each route planning method is reduced, and the route planning efficiency is improved. On the other hand, the candidate route set planned by the plurality of route planning methods is obtained, which complements the shortcomings of results of a single route planning method, and by performing route deduplication on the candidate route set, it can be ensured that the obtained travel route set is an accurate and reliable result, so that travel routes can be planned quickly and accurately.

In an embodiment, each route planning method has at least two corresponding route planning constraint conditions. The route planning constraint conditions correspond to the travel preference conditions. Each route planning method may correspond to at least two travel preference conditions.

Specifically, the travel preference conditions may also be planned according to the plurality of route planning constraint conditions based on the same route planning method, to obtain travel routes corresponding to the travel preference conditions. For example, using that the route planning methods include a heuristic search-based route planning method and a blind search-based route planning method as an example, where each route planning method includes three route planning constraint conditions, corresponding to search only for subway, search only for bus, and search for subway+bus (without distinguishing between search orders of the subway and the bus), respectively. Specifically, a travel preference condition of "subway priority" matches route planning constraint conditions of "search only for subway" and "search for subway+bus". Therefore, the route planning may be performed according to the route planning constraint conditions of "search only for subway" and "search for subway+bus" based on the heuristic search-based route planning method and the blind search-based route planning method respectively, to obtain four groups of candidate planned routes. By configuring at least two route planning constraint conditions for each route planning method, a combination of the plurality of route planning methods and the route planning constraint conditions may be implemented, so as to implement a targeted and high-efficient search, and combine the obtained multiple groups of candidate planned routes. Based on the implementation of the high-efficient search, the shortcomings that may exist in results obtained by different search methods are complemented, and the accuracy of the route planning result is ensured.

In an embodiment, the performing, for each route planning method, route planning respectively based on the route planning constraint conditions corresponding to the corresponding route planning method, the start place, and the destination includes:

performing, for each route planning method, the route planning in sequence based on each route planning constraint condition corresponding to the corresponding route planning method, the start place, and the destination by using a route planning thread corresponding to the route planning method.

Specifically, the same route planning method may be implemented by the same route planning thread. For different route planning constraint conditions of the same travel preference condition under the route planning method, the same route planning thread may perform route planning in sequence based on the plurality of route planning constraint conditions, which reduces the occupation of threads and implements the saving of resources.

For example, a route planning method A is implemented by a route planning thread 1, and the route planning method A corresponds to the route planning constraint conditions A1, A2, and A3. The route planning thread 1 may first execute a data processing process corresponding to the route planning method A based on the route planning constraint condition A1, then execute the data processing process corresponding to the route planning method A based on the route planning constraint condition A2, and finally execute the data processing process corresponding to the route planning method A based on the route planning constraint condition A3. Based on three execution results of the route planning thread 1, candidate routes corresponding to the route planning method A are obtained.

In another embodiment, the performing, for each route planning method, route planning respectively based on the route planning constraint conditions corresponding to the corresponding route planning method, the start place, and the destination includes:

performing, for each route planning method, the route planning in parallel based on the start place and the destination by using a plurality of route planning threads, each route planning thread corresponding to each route planning constraint condition corresponding to the route planning method.

Specifically, different route planning constraint conditions of the same route planning method may be implemented by different route planning threads, that is, each route planning thread implements a route planning method corresponding to the route planning constraint conditions. The route planning is performed in parallel based on the plurality of route planning threads, which reduces route planning time and improves route planning efficiency.

For example, the route planning method A is implemented by route planning threads 1, 2, and 3, and the route planning method A corresponds to the route planning constraint conditions A1, A2, and A3. The route planning thread 1 may execute the data processing process corresponding to the route planning method A based on the route planning constraint condition A1, the route planning thread 2 may execute the data processing process corresponding to the route planning method A based on the route planning constraint condition A2, and the route planning thread 3 may execute the data processing process corresponding to the route planning method A based on the route planning constraint condition A3. Based on execution results of the route planning threads 1, 2, and 3, candidate routes corresponding to the route planning method A are obtained.

Further, the route planning thread may be implemented by the route planning engine. For example, the route planning thread 1 is implemented by a route planning engine 1, and the route planning thread 2 is implemented by a route planning engine 2. For example, the route planning method includes BFS search and A* search. Correspondingly, the route planning constraint conditions corresponding to the travel preference conditions are "search only for subway" and "search for subway+bus". The route planning thread may be implemented by a route planning engine corresponding to the BFS search and a route planning engine corresponding to the A* search. Each route planning engine performs processing twice according to "search only for subway" and "search for subway+bus" respectively, and a total of four groups of candidate routes are obtained. The route planning thread may further be implemented by a plurality of route planning engines, each route planning engine performs processing once, and a plurality of groups of candidate routes are obtained. Using that a quantity of the plurality of route planning engines is four as an example. The four route planning engines may be route planning engines corresponding to BFS search of "search only for subway", BFS search of "search for subway+bus", A* search of "search only for subway", and A* search of "search for subway+bus", respectively.

The BFS search is a search method in blind search, which is to search for a plurality of expansion nodes at a time according to node levers from a start node, and search through a plurality of route planning branches simultaneously. The blind search, also referred to as non-heuristic search, is an uninformative search that searches according to a predetermined search strategy without taking into account the characteristics of the problem itself.

The heuristic search includes the A* search. The A* search is a search method that determines a target expansion node of each node by way of node prediction, and then determines candidate routes from a start node to a destination node based on the target expansion node. The heuristic search is to use heuristic information of the problem to guide the search, to reduce the scope of the search and the complexity of the problem.

In an embodiment, the travel preference condition is one of a plurality of candidate travel preference conditions. The travel route planning method further includes:

determining, for each candidate travel preference condition, candidate travel methods matching the candidate travel preference condition, the candidate travel methods including at least one of a single-vehicle travel and a multiple-vehicle combination travel; and determining, based on the route planning constraint conditions corresponding to each route planning method under each candidate travel method, a matching relationship between the candidate travel preference conditions and the route planning constraint conditions corresponding to the route planning method.

The candidate travel preference conditions are specifically displayed on a display interface of the terminal. The user may select several conditions by trigger operations, and the conditions are, for example, subway priority, few walks, short time, few transfers, no subway rides, comprehensive recommendation, and the like.

The candidate travel method refers to a type of a vehicle used for travel, which may specifically include the single-vehicle travel and the multiple-vehicle combination travel. The single-vehicle travel may be a travel through a single vehicle or a travel through a combination of multiple vehicles belonging to the same type. The multiple-vehicle combination travel may be a travel through a combination of two or more vehicles.

Using that the vehicles include a bus and a subway as an example, the single-vehicle travel may correspond to a route planning constraint condition of "search only for subway" or "search only for bus". The multiple-vehicle combination travel may correspond to a route planning constraint condition of "search for subway+bus".

Figure 4A:
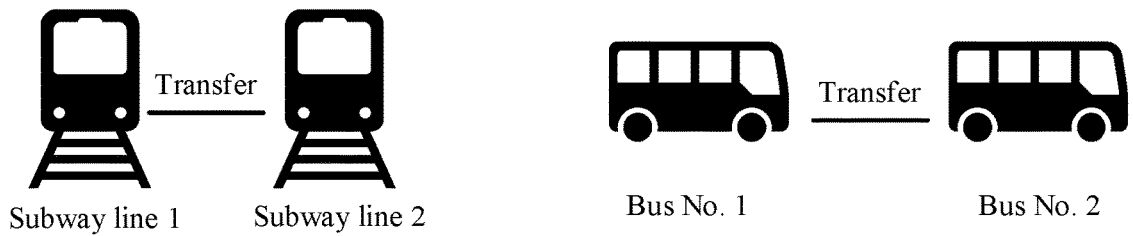
FIG. 4A is a schematic diagram of a single-vehicle travel in an embodiment.
Figure 4B:
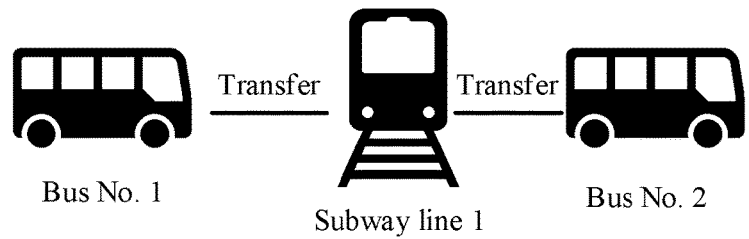
FIG. 4B is a schematic diagram of a multiple-vehicle combination travel in an embodiment.

For example, as shown in FIG. 4A, the single-vehicle travel may include taking the subway only, for example, transferring from subway line 1 to subway line 2, or by bus only from bus No. 1 to bus No. 2. As shown in FIG. 4B, the multiple-vehicle combination travel includes taking both the bus and the subway, for example, transferring from bus No. 1 to subway line 1 and then transferring to bus No. 2.

Specifically, for the same candidate travel preference condition, there may be a plurality of matching candidate travel methods. Using that the travel methods include a bus travel and a subway travel as an example, candidate travel methods corresponding to the travel preference condition of "subway priority" may be by subway only and by bus and subway, and correspond to the route planning constraint condition of "search only for subway" or "search for subway+bus". A candidate travel method corresponding to the travel preference condition of "no subway rides" may be by bus only, and corresponds to the route planning constraint condition of "search only for bus". Candidate travel methods corresponding to the travel preference conditions of "few walks", "short time", "few transfers" and "comprehensive recommendation" may be by subway only, by bus only, and by bus and subway, and correspond to the route planning constraint conditions of "search only for subway", "search only for bus", and "search for subway+bus". The route planning constraint conditions corresponding to each route planning method corresponding to the travel preference conditions of "few walks", "short time", "few transfers" and "comprehensive recommendation" may be the same or different. For example, in the blind search-based route planning method, the route planning constraint conditions may further include a search space restriction condition. The search space restriction condition corresponds to the travel preference condition, to be specific, which may be a search node breadth restriction, a search node depth restriction, or the like.

In this embodiment, by determining the matching relationship between the candidate travel preference conditions and the route planning constraint conditions corresponding to the route planning method, after determining travel preference conditions selected by the user, the corresponding route planning constraint conditions can be quickly and accurately determined, and the data processing efficiency can be improved.

In an embodiment, the route planning includes route planning based on an expansion node. For a to-be-planned target node in travel road network data, based on the target node and a connection coefficient between the corresponding connection nodes, a connection node whose connection coefficient is a target value is used as an expansion node corresponding to the target node. The target node is a start node corresponding to the start place or a determined expansion node.

The connection node whose connection coefficient is the target value is determined based on the candidate travel method. Specifically, a connection coefficient between any two connection nodes is the target value in travel road network data corresponding to the multiple-vehicle combination travel, and a connection coefficient between two connection nodes of the same node type is the target value in travel road network data corresponding to the single-vehicle travel, the node type being used to characterize a type of a vehicle corresponding to the node.

The target node refers to a determined travel site in a route planning process, such as a start site corresponding to the start place or a site corresponding to the expansion node. The travel site may specifically be a bus site or a subway site. The vehicle type corresponding to the node refers to a vehicle type corresponding to the travel site. For example, a vehicle type corresponding to the bus site is a bus, and correspondingly, a node type of the node corresponding to the bus site is a bus node. Similarly, a node type of the node corresponding to the subway station is a subway node. The two connection nodes of the same node type may be a bus node and a bus node, a subway node and a subway node, and nodes corresponding to other same vehicles.

Figure 5A:
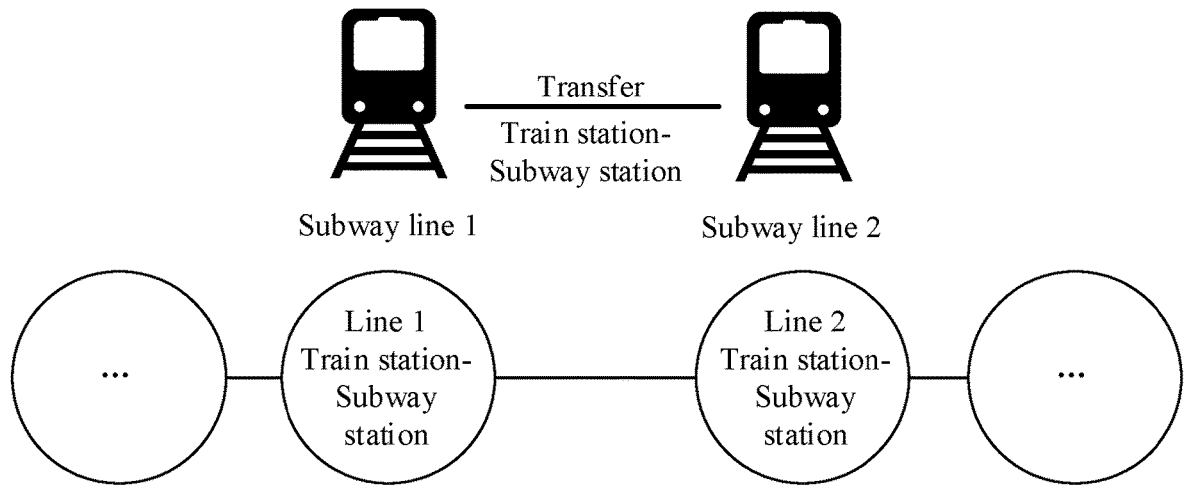
FIG. 5A is a schematic diagram showing a corresponding relationship between a travel site and a connection node in an embodiment.
Figure 5B:
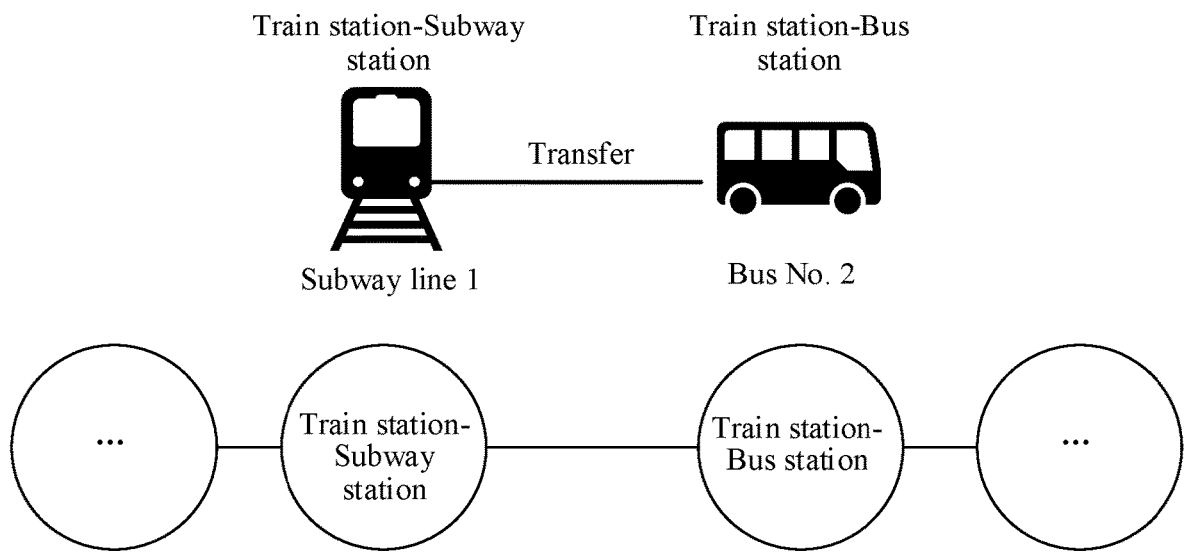
FIG. 5B is a schematic diagram showing a corresponding relationship between a travel site and a connection node in another embodiment.

The two connection nodes refer to travel sites through which it is possible to transfer from a route A to a route B. The route refers to a route that can be reached by a vehicle without transfer, such as subway line 1, subway line 2, bus No. 222, bus No. 123, or the like. The same transfer site corresponding to different routes is regarded as a different connection node. As shown in FIG. 5A, for example, a transfer station of subway line 1 and subway line 2 is train station-subway station, then the train station-subway station of subway line 1 is one node, and the train station-subway station of subway line 2 is the other node, and the two nodes are connection nodes with each other. For another example, as shown in FIG. 5B, transfer stations of subway line 1 and bus No. 2 are train station-subway station and train station-bus station, respectively. The train station-subway station of subway line 1 is one node, the train station-bus station of bus No. 2 is the other node, and the two nodes are connection nodes with each other.

The target value refers to a connection coefficient between two connection nodes. Further, for the travel road network data corresponding to the single-vehicle travel, a connection coefficient between two connection nodes of the same node type is represented by the target value. As a result, in the route planning process, a transfer site in which the vehicles are the same can be found accurately, and candidate routes containing the single vehicle can be quickly obtained, thereby avoiding the search of useless nodes and improving the efficiency of node search and route planning.

Figure 6:
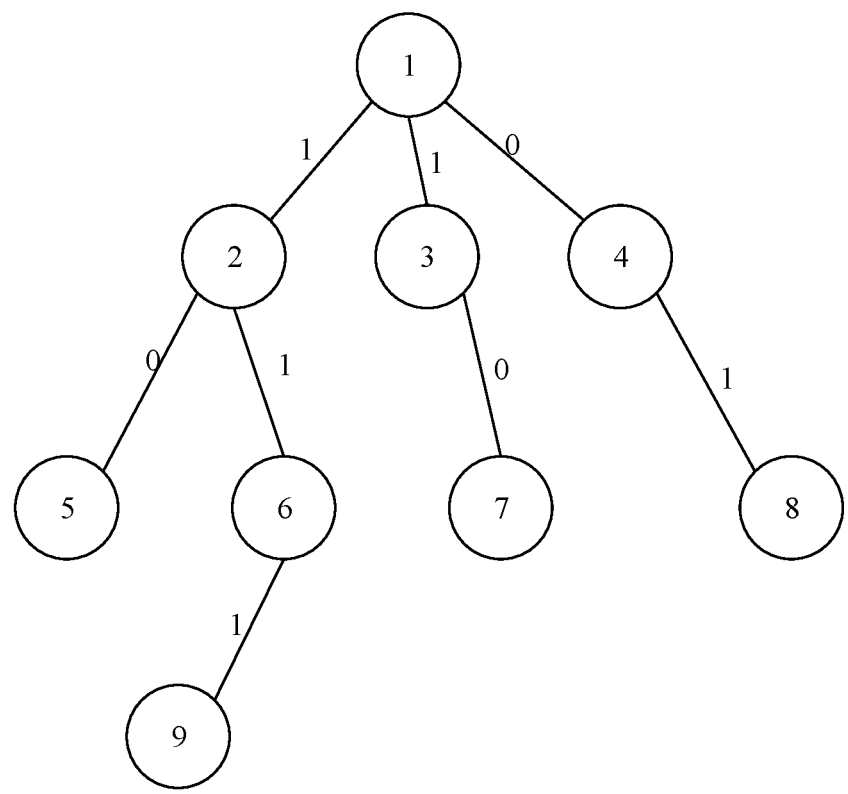
FIG. 6 is a schematic diagram of a node connection coefficient corresponding to a single-vehicle travel in an embodiment.

Further, the target value may be a first value. For example, a connection coefficient between two connection nodes of the same node type may be set to a first value, and a connection coefficient between two connection nodes of different node types may be set to a second value, the first value being different from the second value. The same vehicle and different vehicles are represented by the first value and the second value. On the one hand, the representation of the connection coefficient between the nodes can be simplified, and on the other hand, the efficiency of node search and route planning can be improved. Specifically, the first value may be 1, and the second value may be 0 (such as a connection coefficient between 1 and 4, a connection coefficient between 2 and 5, and a connection coefficient between 3 and 7 as shown in FIG. 6). By setting the connection coefficient to 1 and 0, travel costs of the plurality of nodes can be calculated based on the connection coefficient, and a travel cost of each planned candidate route can be quickly obtained. The travel cost may be a travel time or a travel distance.

Similarly, for the travel road network data corresponding to the multiple-vehicle combination travel, the connection coefficient between two connection nodes of the same node type and the connection coefficient between two connection nodes of different node types take the same value, for example, both are the target values. For example, a connection coefficient between any two connection nodes is the first value, such as the connection coefficient between any two connection nodes is 1, so as to ensure that a search process is not affected by the vehicle type and obtain candidate routes corresponding to the multiple-vehicle combination travel.

When the route planning is performed based on the expansion node, when a connection coefficient between an arbitrary node and a corresponding connection node is the first value, the connection node is used as the expansion node of the node; when a connection coefficient between an arbitrary node and a corresponding connection node is the second value, the search of the connection node is abandoned, thereby avoiding the search of redundant and useless connection nodes, and improving the search efficiency.

In an embodiment, the route planning methods include a heuristic search-based route planning method and a blind search-based route planning method.

The heuristic search is to use heuristic information of the problem to guide the search, to reduce the scope of the search and the complexity of the problem. The blind search, also referred to as non-heuristic search, is an uninformative search that searches according to a predetermined search strategy without taking into account the characteristics of the problem itself.

Specifically, the performing, for each route planning method, route planning respectively based on the route planning constraint conditions corresponding to the corresponding route planning method, the start place, and the destination, to obtain a candidate route set planned in the plurality of route planning methods includes: performing target expansion node prediction in the heuristic search-based route planning method based on the corresponding route planning constraint conditions, a start node corresponding to the start place, and a destination node corresponding to the destination, and determining a first group of candidate routes from the start node to the destination node based on the predicted target expansion node; performing expansion node search in sequence in the blind search-based route planning method based on the corresponding route planning constraint conditions, a start node corresponding to the start place, and a destination node corresponding to the destination, and determining a second group of candidate routes from the start node to the destination node based on the searched expansion node; and the candidate route set includes the first group of candidate routes and the second group of candidate routes.

Further, the heuristic search-based route planning method refers to a search method that determines a target expansion node of each node by way of node prediction, and then determines the candidate routes from the start node to the destination node based on the target expansion node. The heuristic search-based route planning method has the advantage of fast search speeds, but routes obtained by the search may be local optimal rather than global optimal. The blind search-based route planning method refers to a search method that searches the expansion node in sequence according to a node connection relationship, and then determines the candidate routes from the start node to the destination node based on the expansion node. The blind search-based route planning method is a method of traversing the nodes in sequence. A route obtained by the search is a global optimal route, but the search time may be long.

The route planning is performed based on the heuristic search-based route planning method and the blind search-based route planning method, respectively, and based on the corresponding route planning constraint conditions, to quickly obtain the candidate routes, and ensure that the candidate route set can take into account both local optimization and global optimization, and quickly and accurately obtain the candidate route set.

Further, the heuristic search-based route planning method may be either an ordered search algorithm (also referred to as A algorithm) or A* algorithm (also referred to as A-star algorithm). In an embodiment, a processing process of the target expansion node prediction includes:

obtaining candidate expansion nodes corresponding to the target node, and determining an actual travel cost from the start node to each candidate expansion node and an estimated travel cost from each candidate expansion node to the destination node; and screening out, based on a cumulative result of the actual travel cost and the estimated travel cost corresponding to each candidate expansion node, a target expansion node with a smallest cumulative result from the candidate expansion nodes.

The candidate expansion node corresponding to the target node includes a connection node which is connected to the target node and of which the connection coefficient is the target value. The travel cost may be the travel time or the travel distance. In the travel road network data, at least one kind of cost data of the travel time and the travel distance corresponding to each travel site and each transfer site on each travel route is provided. By calculating a travel time or a travel distance from the start node to each candidate expansion node, the actual travel cost is obtained, and by calculating a travel time or a travel distance from each candidate expansion node to the destination node, the estimated travel cost is obtained. By calculating an actual travel cost of planned nodes and an estimated travel cost of to-be-planned nodes, accurate selection of the expansion node is implemented based on the candidate expansion nodes.

Figure 7:
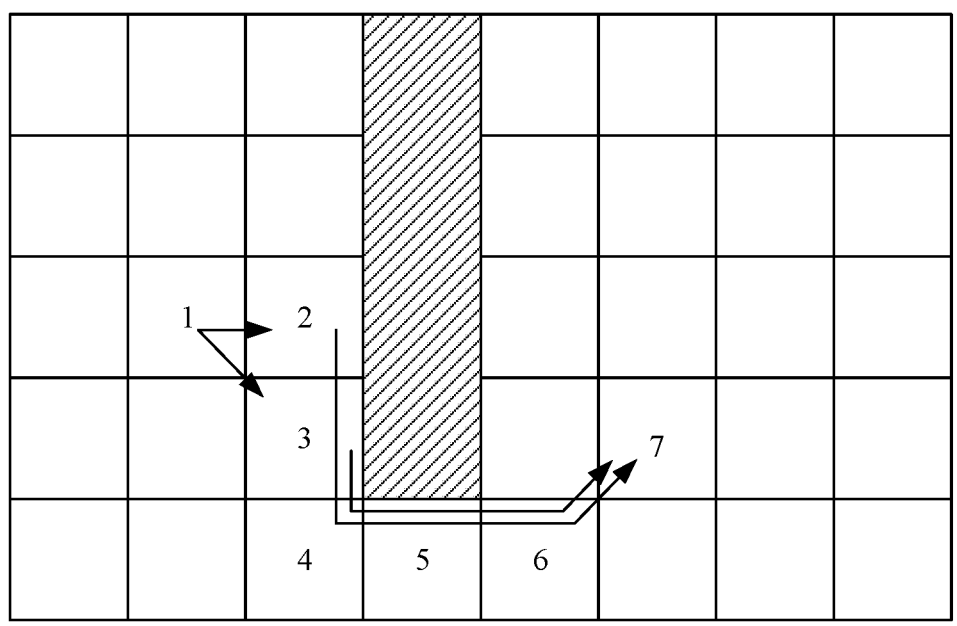
FIG. 7 is a schematic diagram of a search process based on A* (A-star algorithm) search in an embodiment.

Using the A* algorithm as an example, as shown in FIG. 7 (a shaded region represents an impassable region), a position 1 is a start site, and a position 7 is a destination site, a size of the travel cost is calculated based on $f(n)=g(n)+h$ (n), g(n) is an already generated cost from the position 1 to a position n, also referred to as a real cost, and h(n) is an estimated value from the position n to the destination, also referred to as an estimated cost. In FIG. 7, assuming that translation costs of left and right upper lines and corner directions are equivalent, nodes corresponding to positions 2 and 3 are candidate expansion nodes of a node corresponding to the position 1, a distance g(2) from the position 1 to the position 2 is equal to a distance g(3) from the position 1 to the position 3, that is, g(2)=g(3), but due to the presence of an impassable region (shown as a shaded region in the figure), a distance between the position 3 and the position 7 is closer than a distance between the position 2 and the position 7, h(2)>h(3), and thus f(3)<f(2). Using the node corresponding to the position 3 as an expansion node of the node corresponding to the position 1, the traversing is continued from the position 3 until reaching the position 7. In this embodiment, by calculating the actual travel cost and the estimated travel cost, the candidate routes from the start node to the destination node can be obtained accurately and quickly.

In an embodiment, the blind search-based route planning method includes at least one of a breadth first search-based route planning method and a depth first search (DFS)-based route planning method.

The breadth first search-based route planning method is a route planning method in which a plurality of expansion nodes are searched at a time from the start node to perform route planning synchronously through a plurality of route planning branches. The depth first search-based route planning method is a route planning method in which one expansion node is searched at a time from the start node for route planning, and a previous node is returned to for re-performing route planning when the destination node is searched or there is no expansion node.

A specific process of the breadth first search is to: check graph nodes of a graph network corresponding to the travel road network data, add the expansion node of each node to a queue, check expansion node layers one by one after the current layer is checked, and search the entire graph network until the destination node is found. By the breadth first search, a global optimal route with a small quantity of nodes can be obtained.

In contrast to the breadth first search, the depth first search first checks all expansion nodes of the node, and searches as deeply as possible for branches of the graph network. If all expansion nodes of the current node are traversed, a layer where the node is located is returned to for continued traversing. The process is repeated until all nodes are traversed, so as to obtain a global optimal route.

In an embodiment, the route planning constraint conditions of the blind search-based route planning method includes a search space constraint condition. The search space constraint condition refers to a search scope restriction condition in a process of blind search. In the heuristic search-based route planning method, there may be no search space constraint conditions.

Specifically, since different route planning methods themselves have different data processing processes, in order to implement the high-efficiency of each route planning method in the route processing process, different route planning methods themselves may be configured with different search space constraint conditions. Specifically, the route planning constraint condition may be a group of conditions including a search space constraint condition that conforms to the route planning method and an expansion node constraint condition that matches the travel preference condition. The expansion node constraint condition is common to all route planning methods, and the search space constraint condition is unique to the blind search-based route planning method, which may be configured based on the travel preference conditions.

The expansion node constraint condition refers to the definition of a node type corresponding to the expansion node of each node. The node type corresponds to the vehicle type. For example, in the travel preference condition of "search only for subway", the node type of the expansion node of each node is the subway. In the travel preference condition of "search for subway+bus", the node type of the expansion node of each node may be either the subway or the bus.

In an embodiment, the search space constraint condition includes at least one of a node breadth constraint condition and a node depth constraint condition.

The node breadth constraint condition is that a quantity of expansion nodes corresponding to each node is less than or equal to a preset expansion node quantity threshold, and the node depth constraint condition is that a cumulative quantity of nodes from each node to the start node is less than or equal to a preset cumulative node quantity threshold.

Specifically, when a quantity of candidate expansion nodes of a certain node exceeds the preset expansion node quantity threshold, it is necessary to screen the candidate expansion nodes to ensure that the quantity of expansion nodes of the node is less than or equal to the preset expansion node quantity threshold. When a cumulative quantity of nodes from a certain node to the start node exceeds a preset node depth threshold, the search for the node is abandoned, and a previous node of the node is returned to for an expansion node search. By limiting a search space in the process of blind search, it is possible to effectively reduce the search for useless expansion nodes, thereby improving the search efficiency and obtaining search results quickly.

In an embodiment, the performing, for each route planning method, route planning respectively based on the route planning constraint conditions corresponding to the corresponding route planning method, the start place, and the destination, to obtain a candidate route set planned in the plurality of route planning methods includes: obtaining travel road network data marked with candidate direct routes from the start place to the destination; performing, for each route planning method, route planning respectively based on the route planning constraint conditions corresponding to the corresponding route planning method, the travel road network data, a start site, and a destination site, to obtain a plurality of candidate transfer routes planned in the plurality of route planning methods; and the candidate route set includes the candidate direct routes and the candidate transfer routes.

The candidate direct route refers to a travel route from the start site to the destination site without a transfer. For example, the candidate direct route may be a travel route from the start site to the destination site via bus No. 1, and for another example, a travel route from the start site to the destination site via subway line 1.

Specifically, the travel road network data marked with the candidate direct routes from the start place to the destination may be to set a connection coefficient of connection between corresponding nodes of the start site corresponding to the start place and the destination site corresponding to the destination through the direct route to a set value, so that a destination node corresponding to the direct route is not used as the expansion node of the start site in the route planning process, thereby separating a planning process of the candidate direct route from a planning process of the candidate transfer route, which further reduces the data processing amount of the candidate transfer route in the route planning process, and improves the planning efficiency of the candidate transfer route.

In an embodiment, the obtaining travel road network data marked with candidate direct routes from the start place to the destination includes: obtain the start site corresponding to the start place and the destination site corresponding to the destination; obtaining a first travel route set and a second travel route set based on travel sites and travel routes in the travel road network data, travel routes in the first travel route set including the start site, and travel routes in the second travel route set including the destination site; and determining the candidate direct routes from the start place to the destination based on a same travel route when the first travel route set and the second travel route set have the same travel route, and obtaining the travel road network data marked with the candidate direct routes.

Figure 8A:
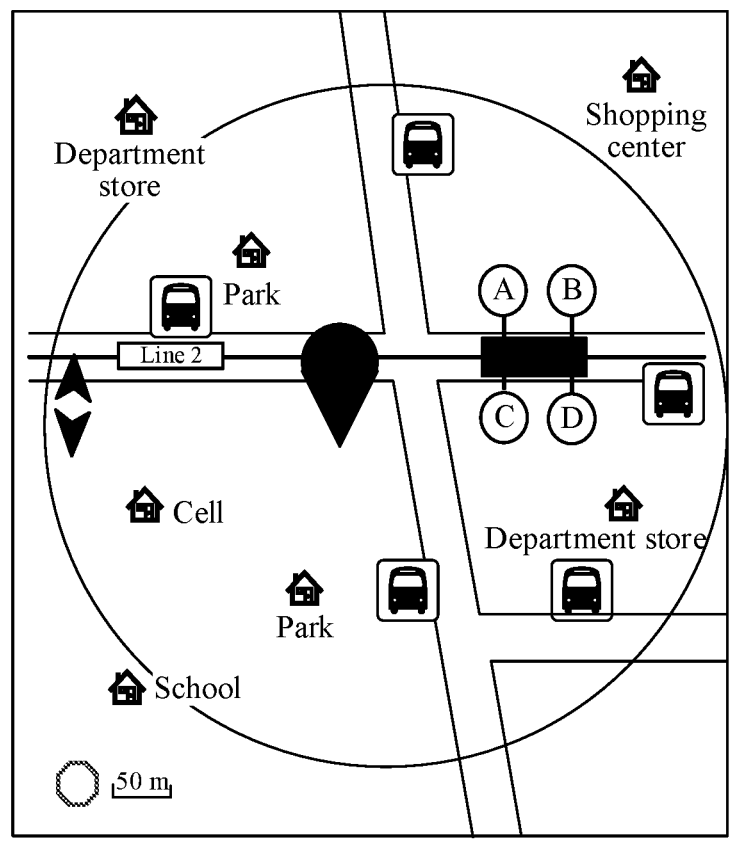
FIG. 8A is a schematic diagram of a start site corresponding to a start place in an embodiment.

A determining process of the start site corresponding to the start place may include: as shown in FIG. 8A, searching for travel sites within a range with a preset radius or diameter based on a position of the start place when centering on the position, sorting the searched travel sites according to the magnitude of a distance from the start place if a quantity of travel sites searched is greater than a preset site quantity, and screening out close start sites whose quantity meets the preset site quantity from the searched travel sites, and using the searched travel site as the start site if the quantity of travel sites searched is less than or equal to the preset site quantity. The determining process of the start site may further include: searching for travel sites in a diffusive manner based on the position of the start place when centering on the position, stopping the search when the quantity of travel sites searched is equal to the preset site quantity or the range with the preset radius or diameter reaches a preset search distance threshold, and using the searched travel site as the start site. A determining process of the destination site corresponding to the destination is the same as the determining process of the start site corresponding to the start place.

For example, the travel site in the travel road network data may be a specific bus station or subway station. For example, the travel route may be specifically subway line 1 or bus No. 123. A quantity of start sites may be multiple, for example, using that the start place is a central park as an example, the start sites may include central park north (bus station), central park south (bus station), central park west (bus station), and central park (subway station), where bus No. 1 and bus No. 2 stop at central park north (bus station), then travel routes corresponding to central park north (bus station) include route No. 1 and route No. 2. The first travel route set containing the start site refers to travel routes corresponding to each start site corresponding to the start place.

Figure 8B:
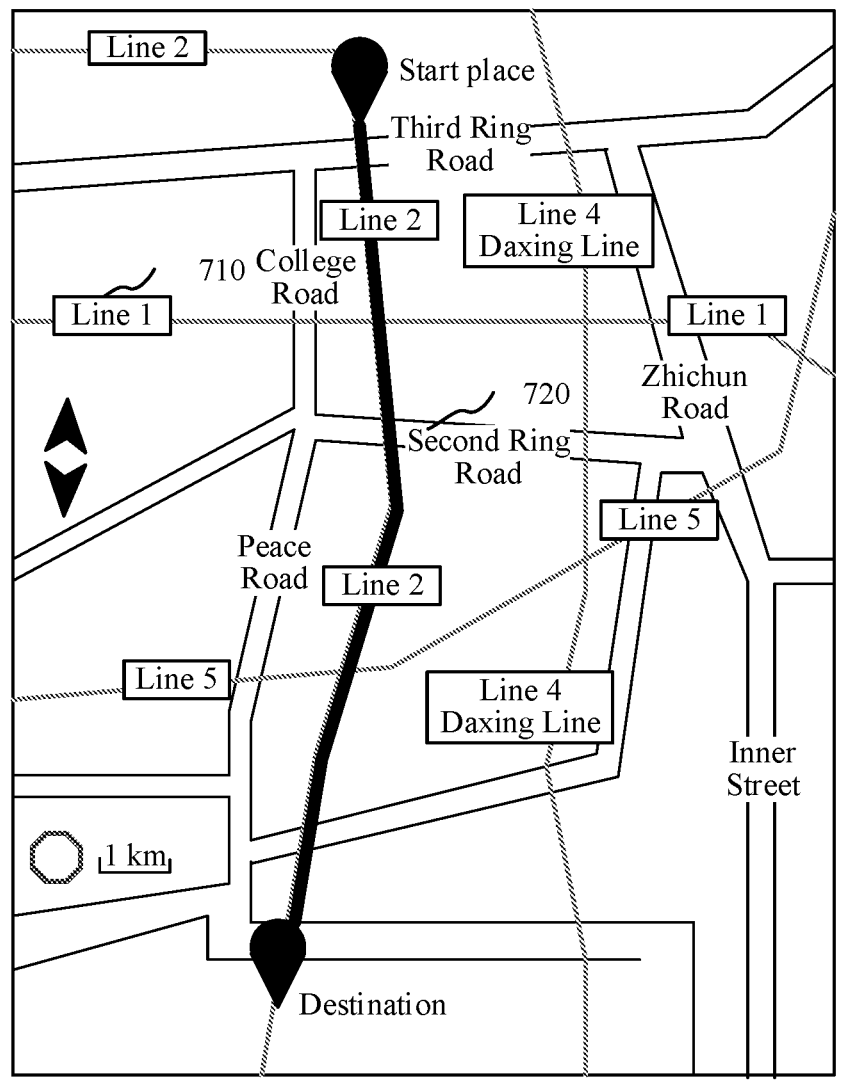
FIG. 8B is a schematic diagram of a direct travel route in an embodiment.

A travel route present in both the first travel route set and the second travel route set is the direct travel route. As shown in FIG. 8B, a route from the start site corresponding to the start place to the destination site corresponding to the destination by subway line 2 without a transfer is the direct travel route. Further, the candidate direct routes from the start place to the destination may include a direct travel route from the start site to the destination site, a walking route from the start place to the start site, and a walking route from the destination site to the destination.

Based on whether there is the same travel route in the first travel route set and the second travel route set, the data comparison amount can be reduced, and a determination result can be obtained quickly.

In an embodiment, a determining process of the candidate direct route may further include: obtaining all site sets of the travel routes corresponding to the start site based on the travel site and the travel route in the travel road network data, determining that there is a candidate direct route between the start place and the destination when the site set includes the destination site, and then determining a route corresponding to the candidate direct route from the start place to the destination. Since the site included in the site set is for the travel route corresponding to the start site, based on the site set, it is possible to quickly determine whether there is a candidate direct route between the start place and the destination.

In an embodiment, travel routes in the travel route set have same route characterization parameters, the route characterization parameters including at least one of a travel distance and a travel time.

Through the same route characterization parameters, the travel routes in the travel route set obtained by different route planning methods are comparable, for example, the travel routes are sorted based on the travel time or the travel distance to obtain a recommended travel route for users.

In an embodiment, candidate routes in the candidate route set include transfer sites and travel routes. The performing route deduplication on the candidate route set to obtain a travel route set includes: performing route deduplication processing on candidate routes having the same transfer site and the same travel route in the candidate route set, and performing route merging processing on candidate routes having the same transfer site but different travel routes in the candidate route set, to obtain the travel route set.

The route deduplication refers to a processing process of performing deduplication processing on a plurality of repetitive routes, and retaining only one of the plurality of repetitive routes. The route merging refers to a process of merging different travel routes between the same transfer sites, for example, candidate travel routes from the train station to the central park include: train station (subway station)—subway line 1—first hospital (subway station), first hospital south (bus station)—bus No. 123—central park (bus station), or train station (subway station)—subway line 1—first hospital (subway station), first hospital south (bus station)—bus No. 125—central park (bus station). There are travel routes of No. 123 and No. 125 from first hospital south (bus station) to central park (bus station). By performing the route merging, the two routes may be merged into one, that is, train station (subway station)—subway line 1—first hospital (subway station), first hospital south (bus station)—bus No. 123, bus No. 125—central park (bus station).

By the route deduplication and the route merging, a more concise travel route set can be obtained. By merging the candidate routes with the same transfer site but different travel routes, a merged route may be recommended to the user, so that the user can conveniently select a corresponding bus route based on arrival time of different bus routes during an actual travel, which provides convenience for the user to travel.

Figure 9:
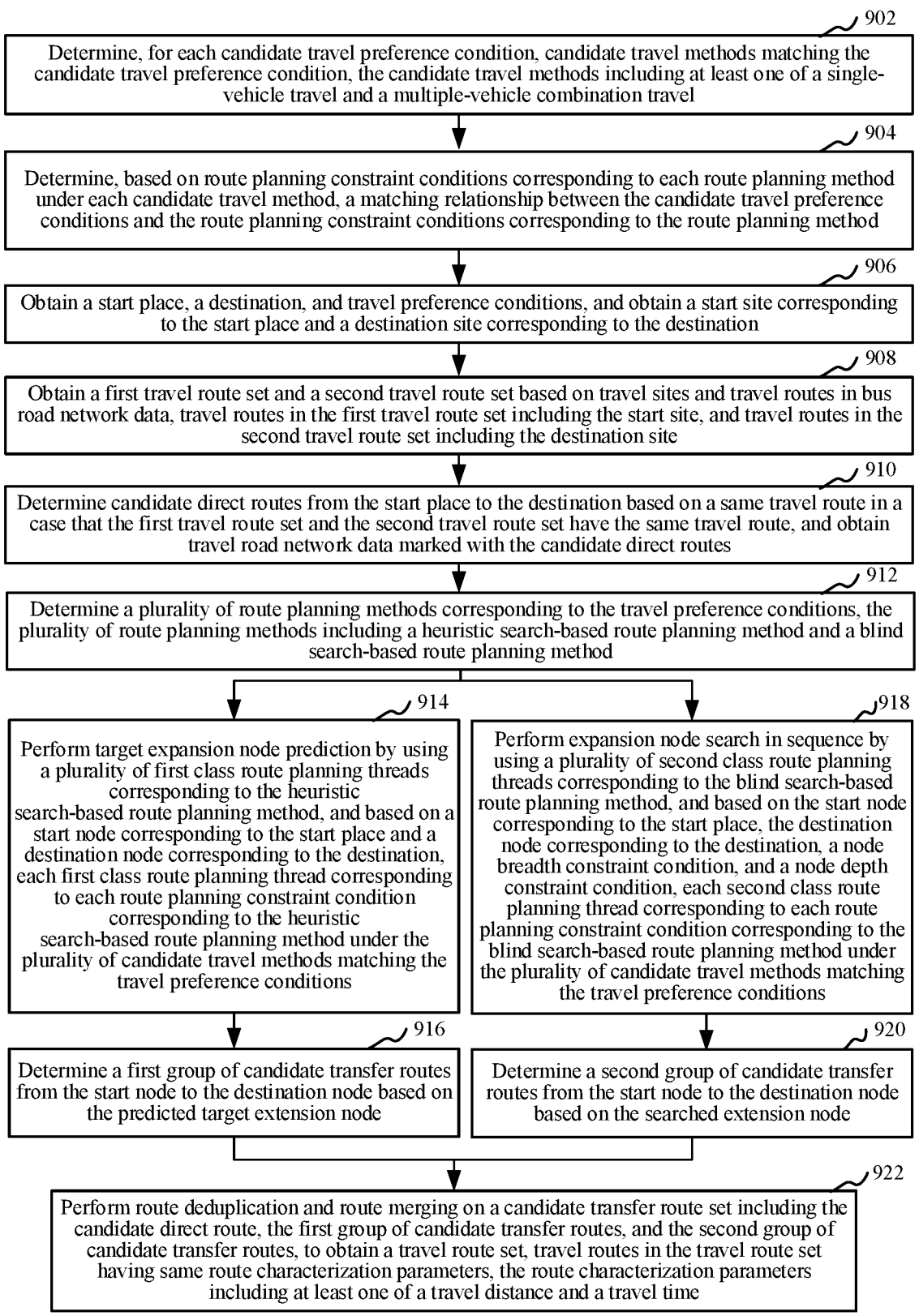
FIG. 9 is a schematic flowchart of a travel route planning method in another embodiment.

In an embodiment, as shown in FIG. 9, a travel route planning method is provided, including the following steps 902 to 922.

Step 902: Determine, for each candidate travel preference condition, candidate travel methods matching the candidate travel preference condition, the candidate travel methods including at least one of a single-vehicle travel and a multiple-vehicle combination travel.

Step 904: Determine, based on route planning constraint conditions corresponding to each route planning method under each candidate travel method, a matching relationship between the candidate travel preference conditions and the route planning constraint conditions corresponding to the route planning method.

Step 906: Obtain a start place, a destination, and travel preference conditions, and obtain a start site corresponding to the start place and a destination site corresponding to the destination.

Step 908: Obtain a first travel route set and a second travel route set based on travel sites and travel routes in travel road network data, travel routes in the first travel route set including the start site, and travel routes in the second travel route set including the destination site.

Step 910: Determine the candidate direct routes from the start place to the destination based on the same travel route when the first travel route set and the second travel route set have a same travel route, and obtain travel road network data marked with the candidate direct routes.

Step 912: Determine a plurality of route planning methods corresponding to the travel preference conditions, the plurality of route planning methods including a heuristic search-based route planning method and a blind search-based route planning method.

Step 914: Perform target expansion node prediction by using a plurality of first class route planning threads corresponding to the heuristic search-based route planning method, and based on a start node corresponding to the start place and a destination node corresponding to the destination, each first class route planning thread corresponding to each route planning constraint condition corresponding to the heuristic search-based route planning method under the plurality of candidate travel methods matching the travel preference conditions.

Step 916: Determine a first group of candidate transfer routes from the start node to the destination node based on the predicted target expansion node.

Step 918: Perform expansion node search in sequence by using a plurality of second class route planning threads corresponding to the blind search-based route planning method, and based on the start node corresponding to the start place, the destination node corresponding to the destination, a node breadth constraint condition, and a node depth constraint condition, each second class route planning thread corresponding to each route planning constraint condition corresponding to the blind search-based route planning method under the plurality of candidate travel methods matching the travel preference conditions.

Step 920: Determine a second group of candidate transfer routes from the start node to the destination node based on the searched expansion node.

Step 922: Perform route deduplication and route merging on a candidate route set including the candidate direct route, the first group of candidate transfer routes, and the second group of candidate transfer routes, to obtain a travel route set, travel routes in the travel route set having same route characterization parameters, the route characterization parameters including at least one of a travel distance and a travel time.

Figure 10:
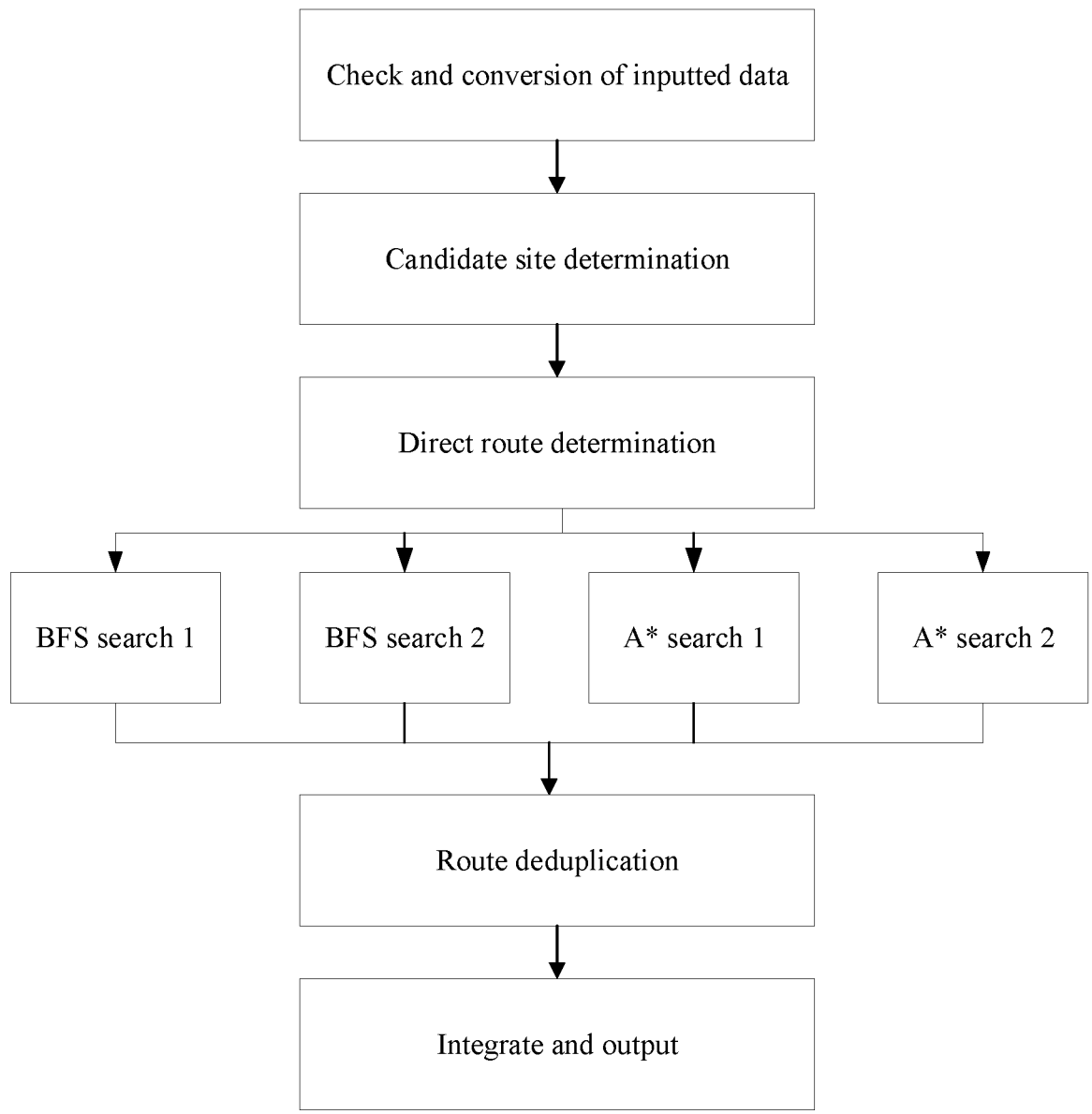
FIG. 10 is a schematic flowchart of a travel route planning method in still another embodiment.

This application further provides an application scenario for travel route planning, and the application scenario applies the above travel route planning method. Specifically, as shown in FIG. 10, the application of the travel route planning method in the application scenario is as follows:

First step: Check and conversion of inputted data. Erroneous inputs are screened out, such as missing points of latitude and longitude and invalid latitude and longitude (for example, locations positioned at sea or in remote mountainous areas where no vehicles are available). The input may be a geographic coordinate or a Mercator coordinate system, and data of different coordinates needs to be unified into a single coordinate.

Second step: Determine candidate sites. There may be a plurality of travel sites near the start place and the destination, but a distance that the user walks from the start place to the start site, and a distance that the user walks from the destination site to the destination after getting off are generally shorter. Some distant and unlikely sites may be filtered out to reduce the pressure of subsequent calculations. The calculated distance may be a straight line distance, a Manhattan distance, or a walking distance. For example, 8 sites are selected as start sites from candidate sites within a line range of 1 km centered on the start place.

Third step: Determine direct routes. The direct routes do not need to be searched based on a graph network, and some high-quality no-transfer routes may be calculated in advance. For example, there is only one subway line 2 from the First Hospital to the train station, which is a direct route without intermediate transfers, and it is only necessary to walk from the start place to the start site and from the destination site to the destination.

Fourth step: Plan transfer routes based on a blind search (such as BFS search) and a heuristic search (such as A* search).

The blind search and the heuristic search are performed in parallel, including but not limited to BFS search and A* search. The route planning constraint conditions are determined based on the travel road network data, the travel preference conditions, and the search space, and the cost calculations of the plurality of route planning methods are comparable, such as uniformly using the distance or time to measure costs of walking and riding.

For different travel preference conditions, the same route planning method may be used, or different route planning methods may be used. Under the travel preference condition of "subway priority", the corresponding candidate travel methods are by subway only and by bus and subway. Correspondingly, the route planning may be performed by A* search (search only for subway lines)+A* search (search for subway+bus), or by A* search (search only for subway lines)+A* search (search for subway+bus)+BFS search (search only for subway lines)+BFS search (search for subway+bus).

A search process of BFS: referring to FIG. 11, an order of traveling sites is 1→(2, 3, 4)→(5, 6, 7, 8)→9, and the obtained candidate transfer routes are 1-4-8, 1-3-7, 1-2-6-9, 1-2-5, and the like.

A search process of A*: referring to FIG. 7, the position 1 is a start site, and the position 7 is a destination site, a size of the travel cost is calculated based on $f(n)=g(n)+h(n)$, $g(n)$ is an already generated cost from the position 1 to a position n, also referred to as a real cost, and $h(n)$ is an estimated value from the position n to the destination, also referred to as an estimated cost. In FIG. 7, assuming that translation costs of left and right upper lines and corner directions are equivalent, nodes corresponding to the positions 2 and 3 are candidate expansion nodes of a node corresponding to the position 1. A distance $g(2)$ from the position 1 to the position 2 is equal to a distance $g(3)$ from the position 1 to the position 3, that is, $g(2)=g(3)$, but a distance between the position 3 and the position 7 is closer than a distance between the position 2 and the position 7, h(2)>h(3), and thus f(3)<f(2). Using the node corresponding to the position 3 as an expansion node of the node corresponding to the position 1, the traversing is continued from the position 3 until reaching the position 7.

Fifth step: Route deduplication. There may be some redundant routes after a plurality of different search methods are closed, that is, a candidate transfer route planned by all the plurality of route planning methods, and it is necessary to exclude duplicate candidate transfer routes.

Sixth step: Integrate and output. The plurality of route planning methods are all implemented based on a traversing algorithm of graph nodes. During a traversing process of the nodes, the travel road network data is subjected to abstract processing, the results need to be converted into the form of the road network, that is, the form of the bus station, and more rich information, such as a type of the route (bus or subway) is filled simultaneously. Finally, by sorting the travel routes in the travel route set, recommended travel routes for users are determined, and the recommended travel routes are pushed to a display page of the electronic map application of the terminal.

Specifically, a preset quantity of candidate travel routes may be searched for by each travel route planning method under each route planning constraint condition. For example, A* search (search only for subway lines)+A* search (search for subway+bus)+BFS search (search only for subway lines)+BFS search (search for subway+bus) each obtains 100 candidate routes, to obtain a candidate route set of 400 candidate routes. It is assumed that the obtained travel route set includes 300 travel routes after the deduplication processing. Based on a quantity of travel routes displayable on the display page of the electronic map application of the terminal (such as 5), the first 5 recommended travel routes are screened out from the 300 travel routes sorted according to priority conditions corresponding to the travel preference conditions, and information of the 5 recommended travel routes are pushed to the terminal.

In an embodiment, as shown in FIG. 12, a travel route recommendation method is provided. A description is made using an example in which the method is applied to the terminal in FIG. 2. The method includes the following steps 1202 to 1206.

Step 1202: Display an inputted start place and destination, and a plurality of candidate travel preference tags on a travel route query page of an electronic map.

The electronic map refers to a map that are stored and consulted digitally using computer technology. The electronic map is made based on digital mapping technology and can be visually displayed on a screen.

The travel route query page of the electronic map is a page used for inputting the start place and the destination, and displaying travel routes from the start place to the destination. The candidate travel preference tags may be a plurality of tags that can be selected by the user through trigger operations, and the candidate travel preference tags may be specifically subway priority, few walks, short time, few transfers, no subway rides, comprehensive recommendation, and the like.

Specifically, on the travel route query page of the electronic map, candidate travel method tags are further displayed. The candidate travel method tags include driving, taxi, bus and subway, biking, and walking. The candidate travel preference tags are displayed in response to a selection operation of a travel method tag of "bus and subway" in the candidate travel method tags.

Further, each candidate travel preference tag corresponds to each candidate travel preference condition. In a route planning module in the server or the terminal, a matching relationship between the candidate travel preference conditions and the route planning constraint conditions corresponding to the route planning method is stored. A determining process of the matching relationship includes:

determining, for each candidate travel preference condition, candidate travel methods matching the candidate travel preference condition, the candidate travel methods including at least one of a single-vehicle travel and a multiple-vehicle combination travel; and determining, based on the route planning constraint conditions corresponding to each route planning method under each candidate travel method, a matching relationship between the candidate travel preference conditions and the route planning constraint conditions corresponding to the route planning method.

Step 1204: Display, in response to a selection operation of a target travel preference tag in the candidate travel preference tags, a travel route recommendation region corresponding to a travel preference condition represented by the target travel preference tag.

The travel route recommendation region refers to a region used for displaying a plurality of planned travel routes, with each target travel preference tag representing a travel preference condition.

Further, in response to a selection operation of the target travel preference tag in the candidate travel preference tags, the selected target travel preference tag is marked as a selected state, and the travel route recommendation region corresponding to the travel preference condition represented by the target travel preference tag is displayed, to remind the user of the currently selected candidate travel preference, so as to display travel routes that meet expectations of the user.

In response to the selection operation of the target travel preference tag in the candidate travel preference tags, based on the selected target travel preference tag by the route planning module in the server or the terminal, the terminal determines the travel preference condition represented by the target travel preference tag and a plurality of route planning methods corresponding to the travel preference conditions, each route planning method having corresponding route planning constraint conditions matching the travel preference conditions. The terminal performs, for each route planning method, route planning respectively based on the route planning constraint conditions corresponding to the corresponding route planning method, the start place, and the destination, to obtain a plurality of travel routes.

Step 1206: Display a plurality of travel routes in the travel route recommendation region in a sorted manner, the plurality of travel routes being obtained by respectively planning in a plurality of route planning methods corresponding to the travel preference conditions, and each travel route connecting the start place and the destination and meeting route planning constraint conditions that match the used route planning method.

Figure 13:
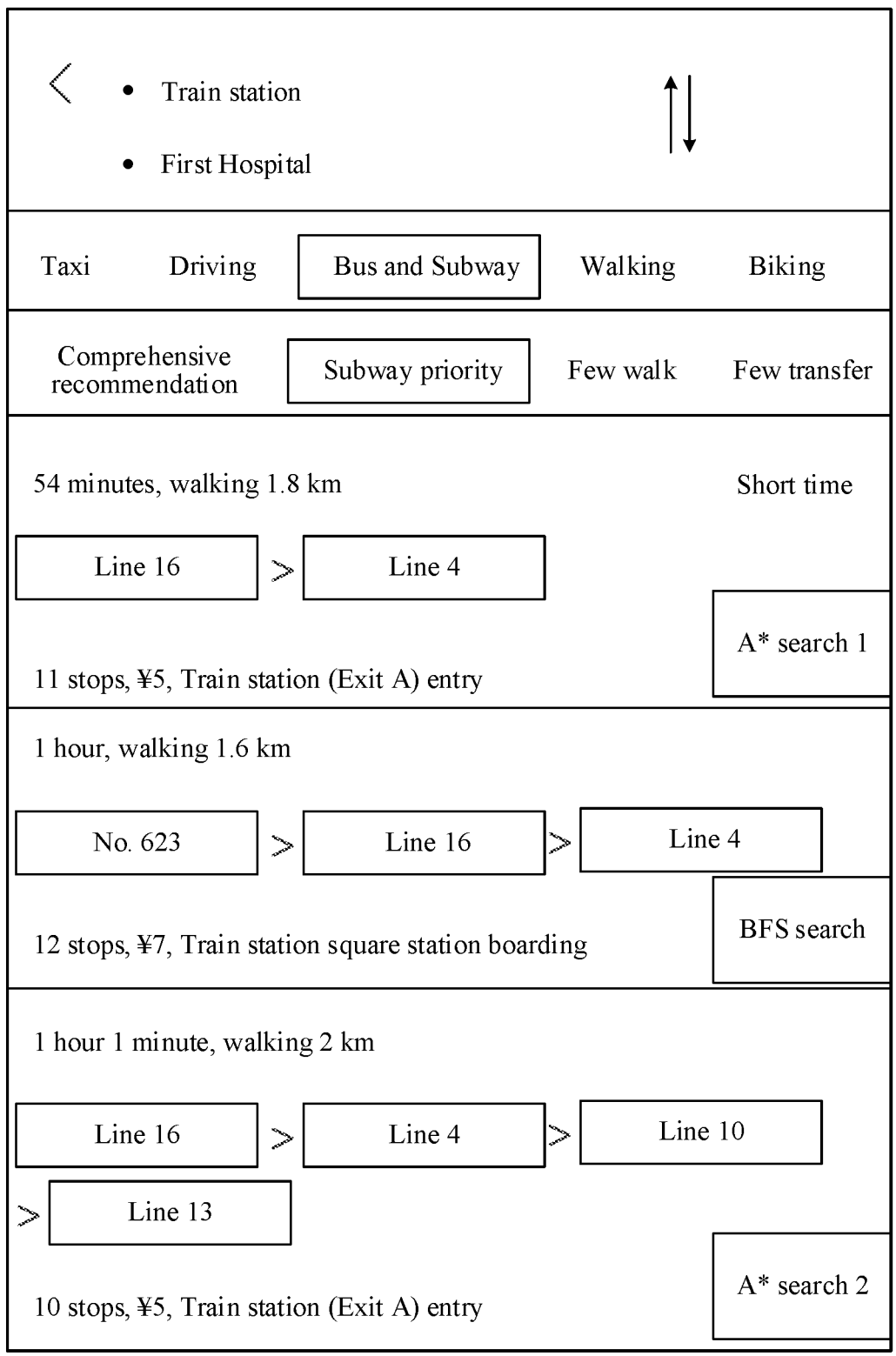
FIG. 13 is a schematic diagram of a display page of an electronic map application in an embodiment.

As shown in FIG. 13, there are a plurality of travel routes displayed in a sorted manner in the travel route recommendation region on the travel route query page. The plurality of travel routes may be travel routes obtained in a way that the route planning module in the server or the terminal plans respectively in the plurality of route planning methods corresponding to the travel preference conditions and based on the route planning constraint conditions matching the used route planning methods.

The plurality of route planning methods include a heuristic search-based route planning method and a blind search-based route planning method. Each route planning method includes a plurality of route planning constraint conditions. The route planning constraint condition may be a type of a searched route. For example, each route planning method includes three route planning constraint conditions: search only for subway, search only for bus, and search for subway+bus (without distinguishing between search orders of the subway and the bus). A travel preference condition of "subway priority" may match route planning constraint conditions of "search only for subway" and "search for subway+bus". Therefore, the route planning may be performed according to the route planning constraint conditions of "search only for subway" and "search for subway+bus" based on the heuristic search-based route planning method and the blind search-based route planning method respectively, to obtain four groups of candidate planned routes. By configuring at least two route planning constraint conditions for each route planning method, a combination of the plurality of route planning methods and the route planning constraint conditions may be implemented, so as to implement a targeted and high-efficient search, and combine the obtained multiple groups of candidate planned routes. Based on the implementation of the high-efficient search, the shortcomings that may exist in results obtained by different search methods are complemented, and the accuracy of the route planning result is ensured.

Further, the planned travel route connects the start place and the destination, which may specifically include a walking route from the start place to the start site, a travel route from the start site to the destination site, and a walking route from the destination site to the destination. The travel route from the start site to the destination site is respectively planned in the plurality of route planning methods corresponding to the travel preference conditions and based on the route planning constraint conditions matching the used route planning methods. The walking route from the start place to the start site may be directly determined based on a relative positional relationship between the start place and the start site in the electronic map, and need not be determined by route planning in the route planning method. Likewise, the walking route from the destination site to the destination may be directly determined based on a relative positional relationship between the destination and the destination site in the electronic map.

Further, a determining process of the start site corresponding to the start place may include: searching for travel sites within a range with a preset radius or diameter based on a position of the start place when centering on the position, sorting the searched travel sites according to the magnitude of a distance from the start place if a quantity of travel sites searched is greater than a preset site quantity, and screening out close start sites whose quantity meets the preset site quantity from the searched travel sites, and using the searched travel site as the start site if the quantity of travel sites searched is less than or equal to the preset site quantity. The determining process of the start site may further include: searching for travel sites in a diffusive manner based on the position of the start place when centering on the position, stopping the search when the quantity of travel sites searched is equal to the preset site quantity or the range with the preset radius or diameter reaches a preset search distance threshold, and using the searched travel site as the start site. A determining process of the destination site corresponding to the destination may be the same as the determining process of the start site corresponding to the start place.

As will be appreciated, a method for determining the recommended travel route in the travel route recommendation method may be specifically implemented by various embodiments in the above travel route planning method.

The above travel route recommendation method displays the inputted start place, destination, and the plurality of candidate travel preference tags on the travel route query page of the electronic map, which is convenient for users to select; displays the travel route recommendation region corresponding to the travel preference condition represented by the target travel preference tag in response to the selection operation of the target travel preference tag in the candidate travel preference tags, which is convenient to display the travel routes determined based on the travel preference condition represented by the target travel preference tag; and displays, in a sorted manner, the plurality of travel routes connecting the start place and the destination and planned respectively in the plurality of route planning methods corresponding to the travel preference conditions in the travel route recommendation region. On the one hand, the plurality of travel routes displayed are planned in the plurality of route planning methods, which complements the shortcomings of the results of the single route planning method, and the travel routes are displayed in a sorted manner, which enables the user to obtain an accurate and reliable travel route. On the other hand, each travel route meets the route planning constraint conditions matching the used route planning method, so that the data processing amount of each route planning method can be reduced based on the route planning constraint conditions in the route planning process, which improves the efficiency of route planning, thereby implementing the fast and accurate recommendation of travel routes.

In an embodiment, the displaying a plurality of travel routes in the travel route recommendation region in a sorted manner, the plurality of travel routes being obtained by respectively planning in a plurality of route planning methods corresponding to the travel preference conditions includes:

displaying a plurality of information display regions in the travel route recommendation region in a sorted manner, the plurality of information display regions being corresponding one-to-one to the plurality of travel routes obtained by respectively planning in the plurality of route planning methods corresponding to the travel preference conditions; and displaying travel route information and start site information of the corresponding travel route in each information display region.

The information display region refers to a region in the travel route recommendation region, and is used for displaying travel route information corresponding to the travel route. Specifically, the information display region may display the travel route information and the start site information. The start site information is used for representing the start site, which may specifically be a name of the start site. The travel route information is used for representing the corresponding travel route, which may specifically be a route identifier of the travel route. The travel route refers to a route that can be reached without a transfer by a vehicle, such as subway line 1, subway line 2, bus No. 222, bus No. 123, or the like. The route identifier of the travel route may be line 1, line 2, No. 222, and No. 123. A plurality of sequentially connected travel routes may be included in the travel routes from the start place to the destination. Two connected travel routes represent that the routes can be switched by transfer.

Further, the plurality of travel routes correspond one to one to the plurality of information display regions. In each information display region, travel route information and start site information corresponding to one travel route is displayed, and the plurality of information display regions are displayed in a sorted manner, so that optimal and sub-optimal recommended travel routes are displayed intuitively, which is convenient for the user to make reference and selection, and provides convenience for the user to travel.

In an embodiment, the travel route recommendation method further includes:

displaying a plurality of sub-regions in the travel route recommendation region, the plurality of sub-regions corresponding one-to-one to the plurality of travel routes; and displaying, in each sub-region, identifier information corresponding to the route planning method used for the corresponding travel route in a planning process.

The sub-region is used for displaying the identifier information corresponding to the route planning method used for planning to obtain the travel route. Each sub-region corresponds to one travel route. By displaying the identifier information corresponding to the route planning method used for the travel route in the sub-region corresponding to the travel route in the planning process, an optimal route planning method corresponding to the obtained travel route can be clearly displayed, and the applicability of the above travel route planning method can be determined accordingly. For example, if the plurality of displayed travel routes are results obtained in the same route planning method, it is characterized that other route planning methods are not applicable to the route planning under the corresponding travel preference conditions, which facilitates developers to optimize and update the route planning constraint conditions matching the travel preference conditions and the corresponding route planning method, thereby further implementing the accuracy of results of the travel route planning and recommendation.

It is to be understood that, although the steps in the flowcharts of FIG. 2, FIG. 9, and FIG. 12 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least some steps in FIG. 2, FIG. 9, and FIG. 12 may include a plurality of steps or a plurality of stages. These steps or the stages are not necessarily performed at the same moment, but may be performed at different moments. The steps or the stages are not necessarily performed in sequence, but may be performed in turn or alternately with another step or at least some of steps or stages of another step.

Figure 14:
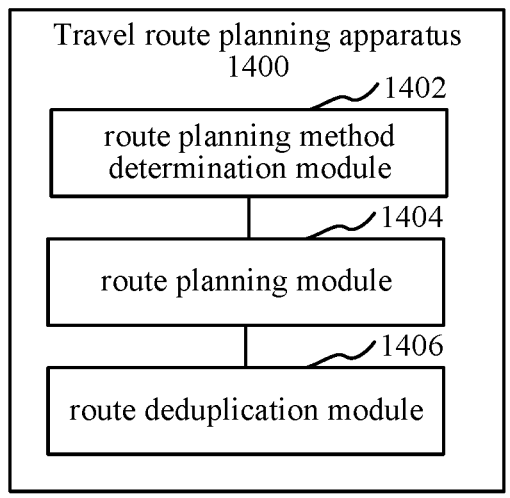
FIG. 14 is a structural block diagram of a travel route planning apparatus in an embodiment.

In an embodiment, as shown in FIG. 14, a travel route planning apparatus 1400 is provided. The apparatus may adopt a software module or a hardware module, or a combination of the two to become a part of the computer device. The apparatus specifically includes: a route planning method determination module 1402, a route planning module 1404, and a route deduplication module 1406.

The route planning method determination module 1402 is configured to obtain a start place, a destination, and travel preference conditions, and determine a plurality of route planning methods corresponding to the travel preference conditions, each route planning method having corresponding route planning constraint conditions matching the travel preference conditions.

The route planning module 1404 is configured to perform, for each route planning method, route planning respectively based on the route planning constraint conditions corresponding to the corresponding route planning method, the start place, and the destination, to obtain a candidate route set planned in the plurality of route planning methods.

The route deduplication module 1406 is configured to perform route deduplication on the candidate route set to obtain a travel route set.

In an embodiment, each route planning method has at least two corresponding route planning constraint conditions. The route planning module is further configured to perform, for each route planning method, the route planning in sequence based on each route planning constraint condition corresponding to the corresponding route planning method, the start place, and the destination by using a route planning thread corresponding to the route planning method.

In an embodiment, the route planning module is further configured to perform, for each route planning method, the route planning in parallel based on the start place and the destination by using a plurality of route planning threads, each route planning thread corresponding to each route planning constraint condition corresponding to the route planning method.

In an embodiment, the travel preference condition is one of a plurality of candidate travel preference conditions. The travel route planning apparatus further includes a candidate travel method determination module and a route planning constraint condition determination module. The candidate travel method determination module is configured to determine, for each candidate travel preference condition, candidate travel methods matching the candidate travel preference condition, the candidate travel methods including at least one of a single-vehicle travel and a multiple-vehicle combination travel. The matching relationship determination module is configured to determine, based on route planning constraint conditions corresponding to each route planning method under each candidate travel method, a matching relationship between the candidate travel preference conditions and the route planning constraint conditions corresponding to the route planning method.

In an embodiment, the route planning module is further configured to perform route planning based on expansion nodes. The route planning module further includes an expansion node determination module configured to use, for a to-be-planned target node in travel road network data and based on the target node and a connection coefficient between the corresponding connection nodes, a connection node whose connection coefficient is a target value as an expansion node corresponding to the target node, the target node being a start node corresponding to the start place or a determined expansion node. A connection coefficient between any two connection nodes is the target value in travel road network data corresponding to the multiple-vehicle combination travel, and a connection coefficient between two connection nodes of the same node type is the target value in travel road network data corresponding to the single-vehicle travel, the node type being used to characterize a type of a vehicle corresponding to the node.

In an embodiment, the route planning methods include a heuristic search-based route planning method and a blind search-based route planning method. The route planning module includes a heuristic search module and a blind search module. The heuristic search module is configured to perform target expansion node prediction in the heuristic search-based route planning method based on the corresponding route planning constraint conditions, a start node corresponding to the start place, and a destination node corresponding to the destination, and determine a first group of candidate routes from the start node to the destination node based on the predicted target expansion node. The blind search module is configured to perform expansion node search in sequence in the blind search-based route planning method based on the corresponding route planning constraint conditions, a start node corresponding to the start place, and a destination node corresponding to the destination, and determine a second group of candidate routes from the start node to the destination node based on the searched expansion node. The candidate route set includes the first group of candidate routes and the second group of candidate routes.

In an embodiment, the heuristic search module includes a travel cost calculation module and an expansion node screening module. The travel cost calculation module is configured to obtain candidate expansion nodes corresponding to the target node, and determine an actual travel cost from the start node to each candidate expansion node and an estimated travel cost from each candidate expansion node to the destination node. The expansion node screening module is configured to screen out, based on a cumulative result of the actual travel cost and the estimated travel cost corresponding to each candidate expansion node, a target expansion node with a smallest cumulative result from the candidate expansion nodes.

In an embodiment, the blind search-based route planning method includes at least one of a breadth first search-based route planning method and a depth first search-based route planning method. The breadth first search-based route planning method is a route planning method in which a plurality of expansion nodes are searched at a time from the start node to perform route planning synchronously through a plurality of route planning branches. The depth first search-based route planning method is a route planning method in which one expansion node is searched at a time from the start node for route planning, and a previous node is returned to for re-performing route planning when the destination node is searched or there is no expansion node.

In an embodiment, route planning constraint conditions corresponding to the blind search-based route planning method further includes at least one of a node breadth constraint condition and a node depth constraint condition. The node breadth constraint condition is that a quantity of expansion nodes corresponding to each node is less than or equal to a preset expansion node quantity threshold, and the node depth constraint condition is that a cumulative quantity of nodes from each node to the start node is less than or equal to a preset cumulative node quantity threshold.

In an embodiment, the route planning module includes a travel road network data obtaining module and a candidate transfer route planning module. The travel road network data obtaining module is configured to obtain travel road network data marked with candidate direct routes from the start place to the destination. The candidate transfer route planning module is configured to perform, for each route planning method, route planning respectively based on the route planning constraint conditions corresponding to the corresponding route planning method, the travel road network data, a start site, and a destination site, to obtain a plurality of candidate transfer routes planned in the plurality of route planning methods. The candidate route set includes the candidate direct routes and the candidate transfer routes.

In an embodiment, the travel road network data obtaining module includes: a start site and destination site obtaining module, a travel route set obtaining module, and a candidate direct route determination module. The start site and destination site obtaining module is configured to obtain a start site corresponding to the start place and a destination site corresponding to the destination. The travel route set obtaining module is configured to obtain a first travel route set and a second travel route set based on travel sites and travel routes in the travel road network data, travel routes in the first travel route set including the start site, and travel routes in the second travel route set including the destination site. The candidate direct route determination module is configured to determine the candidate direct routes from the start place to the destination based on a same travel route when the first travel route set and the second travel route set have the same travel route, and obtain the travel road network data marked with the candidate direct routes.

In an embodiment, travel routes in the travel route set have same route characterization parameters, the route characterization parameters including at least one of a travel distance and a travel time.

In an embodiment, the route deduplication module is further configured to perform route deduplication processing on candidate routes having the same transfer site and the same travel route in the candidate route set, and perform route merging processing on candidate routes having the same transfer site but different travel routes in the candidate route set, to obtain the travel route set.

Figure 15:
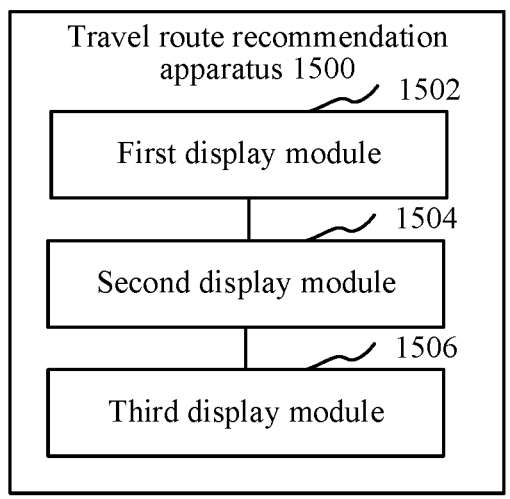
FIG. 15 is a structural block diagram of a travel route recommendation apparatus in an embodiment.

In an embodiment, as shown in FIG. 15, a travel route recommendation apparatus 1500 is provided. The apparatus may adopt a software module or a hardware module, or a combination of the two to become a part of the computer device. The apparatus specifically includes: a first display module 1502, a second display module 1504, and a third display module 1506.

The first display module 1502 is configured to display an inputted start place and destination, and a plurality of candidate travel preference tags on a travel route query page of an electronic map.

The second display module 1504 is configured to display, in response to a selection operation of a target travel preference tag in the candidate travel preference tags, a travel route recommendation region corresponding to a travel preference condition represented by the target travel preference tag.

The third display module 1506 is configured to display a plurality of travel routes in the travel route recommendation region in a sorted manner, the plurality of travel routes being obtained by respectively planning in a plurality of route planning methods corresponding to the travel preference conditions, and each travel route connecting the start place and the destination and meeting route planning constraint conditions that match the used route planning method.

In an embodiment, the third display module includes an information display region display module and a travel route information and start site information display module. The information display region display module is configured to display a plurality of information display regions in the travel route recommendation region in a sorted manner, the plurality of information display regions being corresponding one-to-one to the plurality of travel routes obtained by respectively planning in the plurality of route planning methods corresponding to the travel preference conditions. The travel route information and start site information display module is configured to display travel route information and start site information of the corresponding travel route in each information display region.

In an embodiment, the travel route recommendation apparatus further includes a sub-region display module and a route planning method identifier display module. The sub-region display module is configured to display a plurality of sub-regions in the travel route recommendation region, the plurality of sub-regions corresponding one-to-one to the plurality of travel routes. The route planning method identifier display module is configured to display, in each sub-region, identifier information corresponding to the route planning method used for the corresponding travel route in a planning process.

Specific limitations on the travel route planning apparatus may refer to the limitations on the travel route planning method, and specific limitations on the travel route recommendation apparatus may refer to the limitations on the travel route recommendation method, which are not described again here. The modules in the travel route planning apparatus and the travel route recommendation apparatus may be implemented entirely or partially by software, hardware, or a combination thereof. The modules may be built in or independent of one or more processors of a computer device in a hardware form, or may be stored in a memory of the computer device in a software form, so that the processor invokes and performs an operation corresponding to each of the modules.

In an embodiment, a computer device is provided. The computer device may be a server, and an internal structure diagram thereof may be shown in FIG. 16. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store route planning constraint condition data. The network interface of the computer device is configured to communicate with an external terminal through a network connection. The computer-readable instructions, when executed by the processor, implementing a travel route planning method and a travel route recommendation method.

Figure 16:
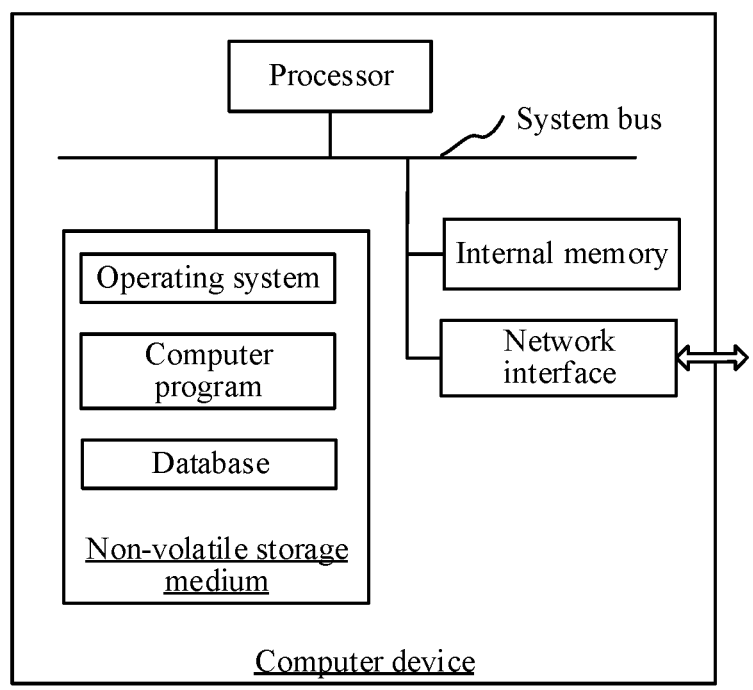
FIG. 16 is an internal structural diagram of a computer device in an embodiment.

A person skilled in the art may understand that, the structure shown in FIG. 16 is only a block diagram of a part of a structure related to a solution of this application and does not limit the computer device to which the solution of this application is applied. Specifically, the computer device may include more or fewer components than those in the drawings, or include a combination of some components, or include different component layouts.

In an embodiment, a computer device is further provided, including a memory and one or more processors, the memory storing computer-readable instructions, and the one or more processors, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer-readable instruction product or computer-readable instructions are provided, the computer-readable instruction product or the computer-readable instructions including computer instructions, the computer instructions being stored in a computer-readable storage medium. One or more processors of a computer device read the computer instructions from the computer-readable storage medium, and the processors execute the computer instructions to cause the computer device to perform the steps in the foregoing method embodiments.

In an embodiment, a computer program product or a computer program is provided, the computer program product or the computer program including computer instructions, the computer instructions being stored in a computer-readable storage medium. One or more processors of a computer device read the computer instructions from the computer-readable storage medium, and the one or more processors execute the computer instructions to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static random access memory (SRAM) or a dynamic random access memory (DRAM).

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A travel route planning method, performed by a computer device, the method comprising:
   obtaining, based on user input on a travel path query page of an electronic map, a start place, a destination, and travel preference conditions;
   determining a plurality of route planning methods corresponding to the travel preference conditions, each route planning method having route planning constraint conditions corresponding to the travel preference conditions;

respectively performing route planning using each route planning method independently based on the route planning constraint conditions corresponding to the corresponding route planning method, the start place, and the destination, to obtain a candidate route set planned;

performing route deduplication on the candidate route set to obtain a travel route set that comprises a plurality of travel routes; and displaying the plurality of travel routes in a travel route recommendation region of the electronic map in a sorted manner, wherein each travel route connects the start place and the destination and meets the route planning constraint conditions that match the route planning method used to generate the travel route, and at least two of the travel routes are generated by using different route planning methods.

2. The method according to claim 1, wherein each route planning method has at least two corresponding route planning constraint conditions; and performing route planning using each route planning method based on the route planning constraint conditions corresponding to the corresponding route planning method, the start place, and the destination comprises:

performing, for each route planning method, the route planning in sequence based on each route planning constraint condition corresponding to the corresponding route planning method, the start place, and the destination by using a route planning thread corresponding to the route planning method.

3. The method according to claim 1, wherein each route planning method has a corresponding route planning engine; each route planning method has at least two corresponding route planning constraint conditions; and performing route planning using each route planning method comprises:

implementing, by each route planning engine, multiple route planning threads executed in parallel to perform the route planning using the corresponding route planning method, each of the route planning threads corresponding to one of the at least two route planning constraints condition corresponding to the route planning method.

4. The method according to claim 1, wherein the travel preference condition is one of a plurality of candidate travel preference conditions; and the method further comprises:

determining, for each candidate travel preference condition, candidate travel methods corresponding to the candidate travel preference condition; and determining, based on the route planning constraint conditions corresponding to each route planning method under each candidate travel method, a corresponding relationship between the route planning constraint conditions corresponding to the route planning method and the candidate travel preference conditions.

5. The method according to claim 4, wherein the route planning comprises route planning based on an expansion node; and the method further comprises:

using, for a to-be-planned target node in travel road network data and based on the target node and a connection coefficient between the corresponding connection nodes, a connection node whose connection coefficient is a target value as an expansion node corresponding to the target node, the target node being a start node corresponding to the start place or a determined expansion node, and the connection node whose connection coefficient is the target value being determined based on the candidate travel method.

6. The method according to claim 5, wherein the candidate travel methods comprise at least one of a single-vehicle travel and a multiple-vehicle combination travel; and a connection coefficient between any two connection nodes is the target value in travel road network data corresponding to the multiple-vehicle combination travel, and a connection coefficient between two connection nodes of the same node type is the target value in travel road network data corresponding to the single-vehicle travel, the node type being used to characterize a type of a vehicle corresponding to the node.

7. The method according to claim 5, wherein the route planning methods comprise a heuristic search-based route planning method and a blind search-based route planning method; and the performing route planning using each route planning method based on the route planning constraint conditions corresponding to the corresponding route planning method, the start place, and the destination, to obtain a candidate route set planned in the plurality of route planning methods comprises:

performing target expansion node prediction in the heuristic search-based route planning method based on the corresponding route planning constraint conditions, a start node corresponding to the start place, and a destination node corresponding to the destination, and determining a first group of candidate routes from the start node to the destination node based on the predicted target expansion node;

performing expansion node search in sequence in the blind search-based route planning method based on the corresponding route planning constraint conditions, a start node corresponding to the start place, and a destination node corresponding to the destination, and determining a second group of candidate routes from the start node to the destination node based on the searched expansion node; and the candidate route set comprises the first group of candidate routes and the second group of candidate routes.

8. The method according to claim 7, wherein the target expansion node prediction comprises:

obtaining candidate expansion nodes corresponding to the target node, and determining an actual travel cost from the target node to each candidate expansion node and an estimated travel cost from each candidate expansion node to the destination node; and screening out a target expansion node with a smallest cumulative result from the candidate expansion nodes based on a cumulative result of the actual travel cost and the estimated travel cost corresponding to each candidate expansion node.

9. The method according to claim 7, wherein the blind search-based route planning method comprises at least one of a breadth first search-based route planning method and a depth first search-based route planning method;

the breadth first search-based route planning method is a route planning method in which a plurality of expansion nodes are searched each time from the start node to perform route planning synchronously through a plurality of route planning branches; and the depth first search-based route planning method is a route planning method in which one expansion node is searched each time from the start node for route planning, and a previous node is returned to for re-performing the route planning when the destination node is searched or there is no expansion node.

10. The method according to claim 7, wherein route planning constraint conditions corresponding to the blind search-based route planning method comprises at least one of a node breadth constraint condition and a node depth constraint condition; and the node breadth constraint condition is that a quantity of expansion nodes corresponding to each node is less than or equal to a expansion node quantity threshold, and the node depth constraint condition is that a cumulative quantity of nodes from each node to the start node is less than or equal to a cumulative node quantity threshold.

11. The method according to claim 1, wherein performing route planning using each route planning method based on the route planning constraint conditions corresponding to the corresponding route planning method, the start place, and the destination, to obtain a candidate route set planned in the plurality of route planning methods comprises:

obtaining travel road network data marked with candidate direct routes from the start place to the destination;

performing, for each route planning method, the route planning respectively based on the route planning constraint conditions corresponding to the corresponding route planning method, the travel road network data, a start site corresponding to the start place, and a destination site corresponding to the destination, to obtain a plurality of candidate transfer routes planned in the plurality of route planning methods; and the candidate route set comprises the candidate direct routes and the candidate transfer routes.

12. The method according to claim 11, wherein the obtaining travel road network data marked with candidate direct routes from the start place to the destination comprises:

obtain the start site corresponding to the start place and the destination site corresponding to the destination;

obtaining a first travel route set and a second travel route set based on travel sites and travel routes in the travel road network data, travel routes in the first travel route set comprising the start site, and travel routes in the second travel route set comprising the destination site; and determining the candidate direct routes from the start place to the destination based on a same travel route when the first travel route set and the second travel route set have the same travel route, and obtaining the travel road network data marked with the candidate direct routes.

13. The method according to claim 1, wherein travel routes in the travel route set have same types of route characterization parameters, the types of route characterization parameters comprising at least one of a travel distance and a travel time.

14. The method according to claim 1, wherein candidate routes in the candidate route set comprise transfer sites and travel routes; and the performing route deduplication on the candidate route set to obtain a travel route set comprises:

performing route deduplication processing on candidate routes having the same transfer site and the same travel route in the candidate route set, and performing route merging processing on candidate routes having the same transfer site but different travel routes in the candidate route set, to obtain the travel route set.

15. A computer device, comprising a memory and one or more processors, the memory storing computer-readable instructions, and the one or more processors, when executing the computer-readable instructions, implementing:

obtaining, based on user input on a travel path query page of an electronic map, a start place, a destination, and travel preference conditions;

determining a plurality of route planning methods corresponding to the travel preference conditions, each route planning method having route planning constraint conditions corresponding to the travel preference conditions;

respectively performing route planning using each route planning method independently based on the route planning constraint conditions corresponding to the corresponding route planning method, the start place, and the destination, to obtain a candidate route set planned;

performing route deduplication on the candidate route set to obtain a travel route set that comprises a plurality of travel routes; and displaying the plurality of travel routes in a travel route recommendation region of the electronic map in a sorted manner, wherein each travel route connects the start place and the destination and meets the route planning constraint conditions that match the route planning method used to generate the travel route, and at least two of the travel routes are generated by using different route planning methods.

16. The computer device according to claim 15, wherein each route planning method has at least two corresponding route planning constraint conditions; and performing route planning using each route planning method based on the route planning constraint conditions corresponding to the corresponding route planning method, the start place, and the destination comprises:

performing, for each route planning method, the route planning in sequence based on each route planning constraint condition corresponding to the corresponding route planning method, the start place, and the destination by using a route planning thread corresponding to the route planning method.

17. The computer device according to claim 15, wherein each route planning method has a corresponding route planning engine; each route planning method has at least two corresponding route planning constraint conditions; and performing route planning using each route planning method comprises:

implementing, by each route planning engine, multiple route planning threads executed in parallel to perform the route planning using the corresponding route planning method, each of the route planning threads corresponding to one of the at least two route planning constraints condition corresponding to the route planning method.

18. The computer device according to claim 15, wherein the travel preference condition is one of a plurality of candidate travel preference conditions; and the method further comprises:

determining, for each candidate travel preference condition, candidate travel methods corresponding to the candidate travel preference condition; and determining, based on the route planning constraint conditions corresponding to each route planning method under each candidate travel method, a corresponding relationship between the route planning constraint conditions corresponding to the route planning method and the candidate travel preference conditions.

19. One or more non-transitory computer-readable storage medium, storing computer-readable instructions, the computer-readable instructions, when executed by one or more processors, causing the one or more processors to implement:
obtaining, based on user input on a travel path query page of an electronic map, a start place, a destination, and travel preference conditions;
determining a plurality of route planning methods corresponding to the travel preference conditions, each route planning method having route planning constraint conditions corresponding to the travel preference conditions;
respectively performing route planning using each route planning method independently based on the route planning constraint conditions corresponding to the corresponding route planning method, the start place, and the destination, to obtain a candidate route set planned;
performing route deduplication on the candidate route set to obtain a travel route set that comprises a plurality of travel routes; and
displaying the plurality of travel routes in a travel route recommendation region of the electronic map in a sorted manner, wherein each travel route connects the start place and the destination and meets the route planning constraint conditions that match the route planning method used to generate the travel route, and at least two of the travel routes are generated by using different route planning methods.

20. The computer-readable storage medium according to claim 19, wherein each route planning method has at least two corresponding route planning constraint conditions; and
performing route planning using each route planning method based on the route planning constraint conditions corresponding to the corresponding route planning method, the start place, and the destination comprises:
performing, for each route planning method, the route planning in sequence based on each route planning constraint condition corresponding to the corresponding route planning method, the start place, and the destination by using a route planning thread corresponding to the route planning method.

* * * * *